(12) United States Patent
Emmons et al.

(10) Patent No.: US 11,448,814 B2
(45) Date of Patent: Sep. 20, 2022

(54) LIGHT CONTROL FILM WITH TURNING FILM AND LENTICULAR DIFFUSER FOR VIEW ENHANCEMENT IN THE HORIZONTAL PLANE

(71) Applicant: 3M INNOVATIVE PROPERTIES COMPANY, St. Paul, MN (US)

(72) Inventors: Robert M. Emmons, St. Paul, MN (US); Kenneth A. Epstein, St. Paul, MN (US); Nicholas A. Johnson, Burnsville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/309,605

(22) PCT Filed: Dec. 18, 2019

(86) PCT No.: PCT/IB2019/060971
§ 371 (c)(1),
(2) Date: Jun. 9, 2021

(87) PCT Pub. No.: WO2020/128871
PCT Pub. Date: Jun. 25, 2020

(65) Prior Publication Data
US 2022/0019014 A1    Jan. 20, 2022

Related U.S. Application Data

(60) Provisional application No. 62/782,802, filed on Dec. 20, 2018.

(51) Int. Cl.
*F21V 8/00* (2006.01)
*G02B 5/02* (2006.01)
(Continued)

(52) U.S. Cl.
CPC ............ *G02B 6/0051* (2013.01); *G02B 5/02* (2013.01); *G02B 5/04* (2013.01); *G02F 1/1336* (2013.01)

(58) Field of Classification Search
CPC .......... G02B 6/0051; G02B 5/02; G02B 5/04; G02F 1/1336
See application file for complete search history.

(56) References Cited

U.S. PATENT DOCUMENTS 7,833,662 B2    11/2010  Kim
9,360,592 B2    6/2016   Hunt
(Continued)

FOREIGN PATENT DOCUMENTS

JP    2010-224113    10/2010
WO    2008061061 A2  5/2008
(Continued)

OTHER PUBLICATIONS

International Search Report for PCT International Application No. PCT/IB2019/060971, dated Apr. 8, 2020, 3 pages.

*Primary Examiner* — Mary Ellen Bowman

(57) ABSTRACT

An optical system comprises a turning film and a lenticular diffuser. The lenticular diffuser comprises a structured surface comprising a plurality of microstructures comprises a plurality of lenticular prisms separated by substantially flat land areas, the lenticular prisms having a rounded tip and two sides comprising a linear base section and a linear tip section connected by a polynomial blend section.

22 Claims, 14 Drawing Sheets

(51) Int. Cl.
*G02B 5/04* (2006.01)
*G02F 1/13357* (2006.01)

(56) References Cited

U.S. PATENT DOCUMENTS

| | | | | |
|---|---|---|---|---|
| 2008/0259634 A1* | 10/2008 | Mi | ............... | G02B 6/0065 |
| | | | | 362/606 |
| 2009/0180191 A1* | 7/2009 | Yamada | ............ | G02B 3/06 |
| | | | | 359/625 |
| 2011/0234580 A1 | 9/2011 | Wang | | |

FOREIGN PATENT DOCUMENTS

| WO | WO 2018-129034 | 7/2018 | | |
|---|---|---|---|---|
| WO | WO 2018-129068 | 7/2018 | | |
| WO | WO 2018-129073 | 7/2018 | | |
| WO | WO-2018129068 A1 * | 7/2018 | ............ | G02B 6/0051 |

* cited by examiner

LIGHT CONTROL FILM WITH TURNING FILM AND LENTICULAR DIFFUSER FOR VIEW ENHANCEMENT IN THE HORIZONTAL PLANE

CROSS REFERENCE TO RELATED APPLICATIONS

This application is a national stage filing under 35 U.S.C. 371 of PCT/IB2019/060971, filed Dec. 18, 2019, which claims the benefit of U.S. Provisional Patent Application No. 62/782,802, filed Dec. 20, 2018, the disclosure of which is incorporated by reference in its/their entirety herein.

FIELD

This invention relates to optical systems including light control films. Such optical systems may be used, for example, in automotive displays.

BACKGROUND

Optical systems are widely used for lap-top computers, hand-held calculators, digital watches, automotive touch-screen displays, and the like. The familiar liquid crystal display (LCD) is a common example of such an optical system. In the LCD display, portions of the liquid crystal have their optical state altered by the application of an electric field. This process generates the contrast necessary to display pixels of information. In some examples, the LCD displays may include combinations of various light control films (LCFs) to modify the light properties of the optical system, including, for example, brightness or light output distributions.

SUMMARY

The described optical systems including a turning film and a lenticular diffuser may be used to improve control of LCD display output distribution and enhance display brightness.

Briefly, the present invention provides an optical system comprising a turning film and a lenticular diffuser. The turning film comprises a first substantially smooth surface, wherein the first substantially smooth surface defines a display axis extending perpendicular to the first substantially smooth surface; and a first structured surface comprising a plurality of first microstructures defining a first plurality of substantially parallel grooves, wherein the turning film outputs light substantially collimated in a first plane. The lenticular diffuser comprises a second substantially smooth surface substantially perpendicular to the display axis; and a second structured surface comprising a plurality of second microstructures defining a second plurality of substantially parallel grooves extending along a plane substantially perpendicular the display axis, wherein the second structured surface comprising a plurality of second microstructures comprises a plurality of lenticular prisms separated by substantially flat land areas, the lenticular prisms having a rounded tip and two sides comprising a linear base section and a linear tip section connected by a polynomial blend section. A cross section of each lenticular prism extends along a plane substantially parallel to the display axis in a direction from the second substantially smooth surface to a vertex. The lenticular diffuser is optically coupled to the turning film. The lenticular diffuser reflects and refracts light substantially collimated in the first plane toward a second plane substantially perpendicular to the first plane. The first plurality of substantially parallel grooves is substantially perpendicular to the second plurality of substantially parallel grooves. The first substantially smooth surface is adjacent the second structured surface.

BRIEF DESCRIPTION OF DRAWINGS

The foregoing and other aspects of this invention are made more evident in the following Detailed Description, when read in conjunction with the attached Figures.

It should be understood that the subject matter of certain Figures of this disclosure may not necessarily be drawn to scale, and that the Figures present non-exclusive examples of the light control films and optical systems disclosed herein.

DETAILED DESCRIPTION

The disclosure describes light control films (LCFs) and optical systems that include the same. An optical system, such as a display assembly, may be more bright at an on-axis position (i.e., the direction of the display normal) and less bright at off-axis positions (e.g., a direction at some angle greater than zero relative to the display normal). In some optical system applications, it may be desirable to control the horizontal light output distribution and reduce off-axis illumination in the vertical direction to provide a display that is as bright or nearly as bright to viewers at an on-axis position and a range of off-axis positions in the horizontal direction with low off-axis light in the vertical direction. For example, it may be desirable to control the horizontal light output distribution in automotive display applications where an instrument display may be in front of the driver (e.g., on-axis with respect to a driver and off-axis with respect to a front seat passenger) or a console display midway between the driver and the front seat passenger (e.g., off-axis with respect to both driver and front seat passenger) to provide a display that is as bright or nearly as bright to the driver and the front seat passenger and reduces off-axis light in the vertical direction.

In some optical system applications, LCFs may be used to control the light output distribution. The described LCFs and optical systems may include a turning film (e.g., prism-like turning structures) and a lenticular diffuser (e.g., curved diffusing structures) to regulate optical output distributions and enhance brightness characteristics. For example, the described LCFs may spread the output distribution in the horizontal direction to enhance display brightness characteristics in on-axis positions and off-axis positions. As compared to LCFs without a turning film and lenticular diffuser, the disclosed LCFs with a turning film and lenticular diffuser may improve control of the display output distribution and enhance display brightness in the horizontal direction while reducing off-axis light in the vertical direction. Thus, the disclosure provides example LCFs and optical systems having horizontal output distributions that enhance display brightness in the horizontal direction, and reduce off-axis light in the vertical direction, relative to the display surface.

Figure 1:
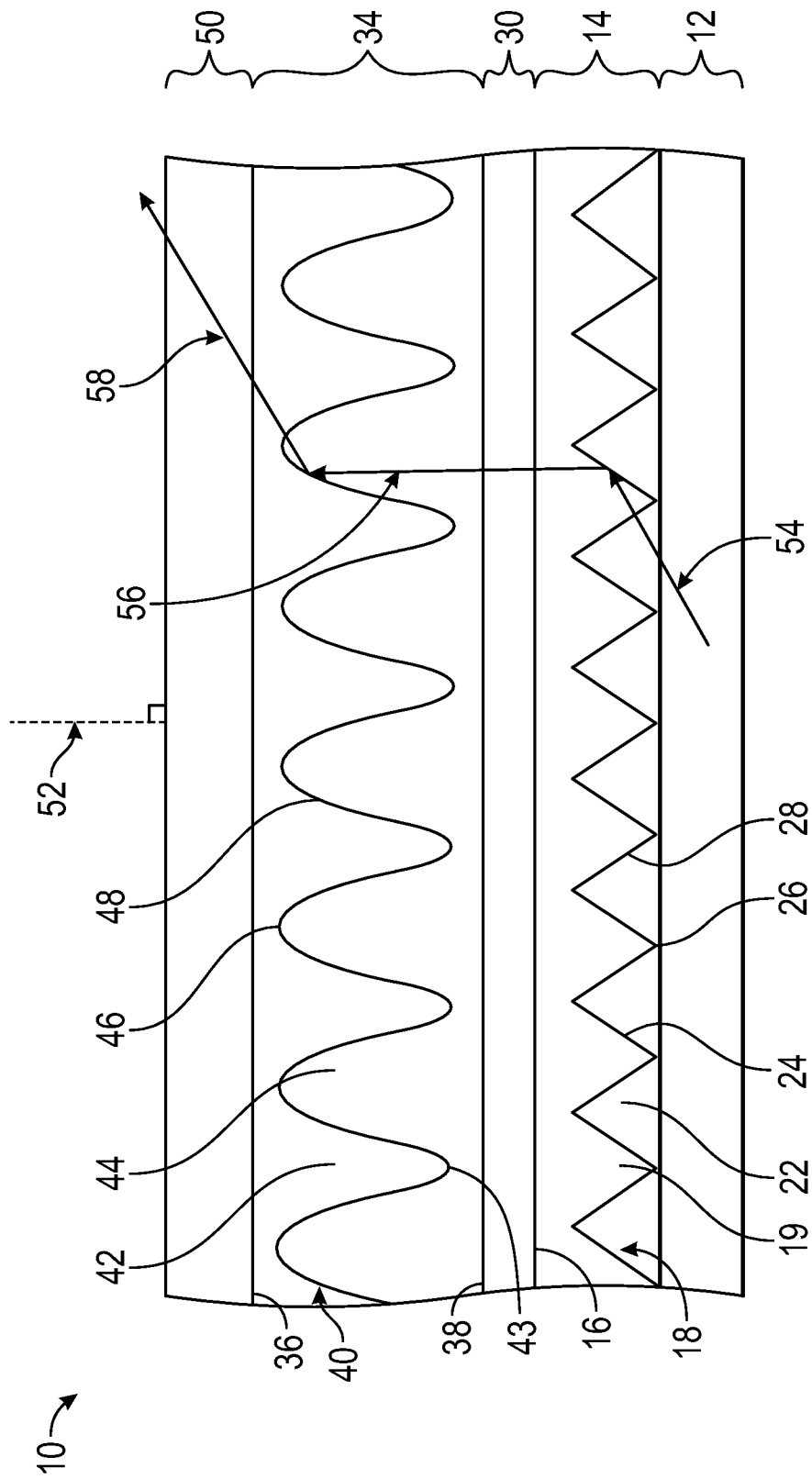
FIG. 1 is a conceptual and schematic lateral cross-sectional view of an example optical system.

The turning films and lenticular diffusers described herein each may include a plurality of microstructures (e.g., prisms). In some examples, the plurality of microstructures of the turning film may include at least two faces that are configured to collimate, refract, and/or reflect light. In some examples, the plurality of microstructures of the lenticular diffuser may include multifaceted prisms that are configured to reflect and/or refract light. For example, FIG. 1 is a conceptual and schematic lateral cross-sectional view of an example optical system 10. In the example of FIG. 1, optical system 10 may include backlight light guide 12, turning film 14, substrate 30, lenticular diffuser 34, and liquid crystal display (LCD) 50. In some examples, a LCF of optical system 10 may include turning film 14 and lenticular diffuser 34.

For illustration purposes, FIG. 1 shows microstructures of turning film 14, as well as for lenticular diffuser 34. In practice, however, a cross-sectional view of optical system 10 would typically show the microstructures of only turning film 14 or only lenticular diffuser 34 because the grooves in turning film 14 are typically substantially perpendicular to the grooves in lenticular diffuser 34. In some examples, lenticular diffuser 34 may be configured to receive light from turning film 14 collimated in a first plane (e.g., light ray 56) and preferentially reflect and/or refract the collimated light toward a second plane orthogonal to the first plane (e.g., light ray 58). For example, lenticular diffuser 34 may receive the collimated light output from a turning film type lightguide, or a wedge or pseudo-wedge lightguide, or the like. In some examples, lenticular diffuser 34 may be configured to spread the collimated light from turning film 14 in a plane horizontal to a display surface. For example, the described LCF including turning film 14 and lenticular diffuser 34 may have features that operate by refracting and/or reflecting light.

In some examples, lenticular diffuser 34 may define substantially smooth surface 38 (e.g., non-structured) and structured surface 40. In some examples, structured surface 40 may include a plurality of microstructures 44 each having multifaceted face 48 and rounded tip 46. In some examples, microstructures 44 may define grooves 42 having a substantially flat land area 33. In some examples, microstructures 44 may be optically coupled to turning film 14 (i.e., no air or other significant gap between lenticular diffuser 34 and turning film 14 that may allow for significant reflection of the surface of adjacent layers).

In some examples, substantially smooth surface 38 may define display axis 52 extending substantially perpendicular to substantially smooth surface 38. In some examples, substantially smooth surface 38 need not be completely smooth, and may qualify as a substantially smooth surface if the surface does not contain microstructures (e.g., non-structured surface). For example, an anti-wetout or anti-glare beaded coating may be included or incorporated on the surface of substantially smooth surface 38, and such a surface may still be considered substantially smooth. In other words, the term smooth is not used in the sense that the surface is non-rough or perfectly planar, but instead is used to indicate that the surface is non-structured.

In some examples, structured surface 40 may include prismatic microstructures 44. In other examples, structured surface 40 may include more than one microstructures 44, e.g., a curved-faced or straight-faced microstructure, an arcuate microstructure, an angular microstructure, and/or multifaceted microstructure. In some examples, each of microstructures 44 may be linear microstructures, i.e., microstructures 44 may extend along a plane perpendicular to display axis 52 with substantially the same (e.g., the same or nearly the same) cross-sectional shape (e.g., as shown in the cross-sectional view of FIG. 1 and extending along a plane into/out of the page). In other examples, microstructures 44 may be linear microstructures extending along a plane parallel to the page (not shown in FIG. 1).

Figure 3:
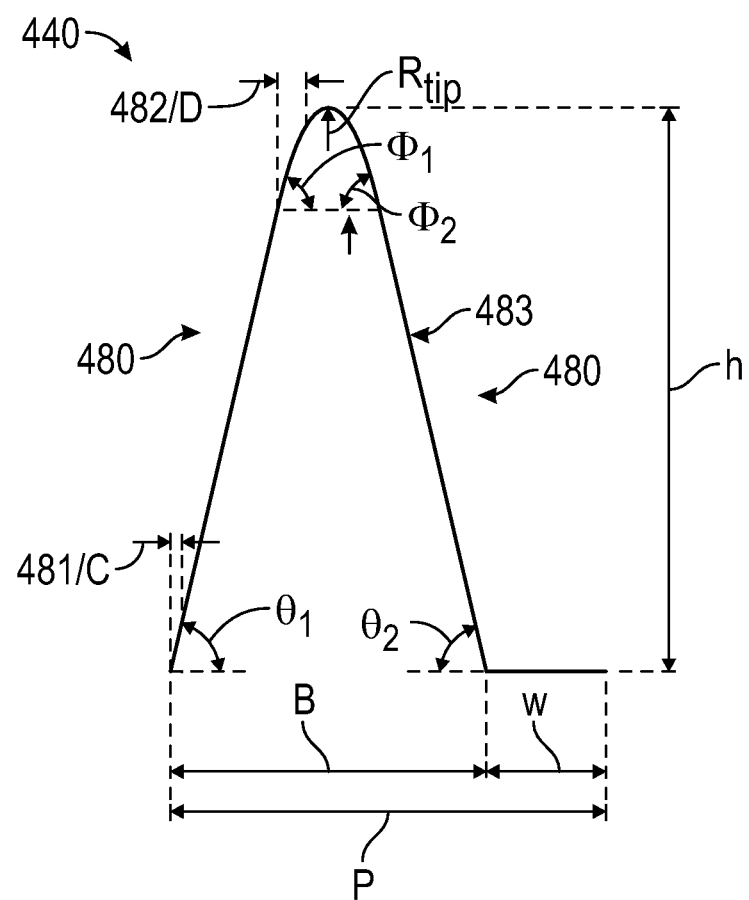
FIG. 3 is a conceptual and schematic lateral cross-sectional view of an example lenticular prism.

In some examples, each of microstructures 44 may be a prism with a multifaceted face 48 and rounded tip 46. In some examples, microstructures 44 may have flat land area 33 between prisms. In some examples, multifaceted face 48 may be configured to preferentially reflect and/or refract light in the horizontal direction, e.g., toward a plane substantially perpendicular to the display axis. For example, as illustrated in FIG. 3, lenticular microstructure 440 has multifaceted faces 480 having a linear base section 481 and linear tip section 482 connected by polynomial blend section 483. In some examples, multifaceted face 480 may be shaped with control parameters to cover the space of desired width and uniformity of output light distributions. In some examples, the cross section of each microstructure may extend substantially parallel to the display axis from substantially smooth surface to vertex.

Lenticular diffuser 34 may be any suitable thickness and may be made from any suitable material. In some examples, microstructures 44 of lenticular diffuser 34 will be formed from a polymeric material, such as polycarbonate, polyethylene terephthalate, polyethylene naphthalate, poly (methyl methacrylate) and copolymers and blends of the same. Other appropriate materials include acrylics, polystyrenes, methyl styrenes, acrylates, polypropylenes, polyvinyl chlorides, and the like. In some examples, lenticular diffuser 34 may be optically transparent or have low haze and high clarity to avoid undesirably scattering incident light. In some examples, the material forming microstructures 44 of lenticular diffuser 34 may have a sufficiently high index of refraction, such as about 1.45 to about 1.75, to facilitate reflection and/or refraction over a sufficiently broad range of angles. In some examples, to achieve a desired high refractive index, particularly suitable materials are UV-curable composites containing Zr particles, as described in U.S. Pat. No. 7,833,662. In some examples the material, dimensions, or both of lenticular diffuser 34 may be selected to produce a flexible film.

Microstructures 44 may be any appropriate size. The pitch of microstructures 45 may be measured from the endpoint of flat land 33 of two consecutive grooves 44. The overall arrangement of microstructures 44 on smooth surface 38 may have any suitable pitch between adjacent microstructures. In some examples, microstructures 44 may be on the millimeter or micrometer scale, for example, pitch of microstructures 44 may be between about 10 micrometers and 200 micrometers, or about 14 micrometers to about 80 micrometers. The pitch or size of microstructures 44 may increase, decrease, both increase and decrease, or remain constant for all or portions of structured surface 40 of lenticular diffuser 34. In some examples, microstructures 44 may all be substantially the same (e.g., the same or nearly the same) or may include a combination of microstructures that are different shapes or sizes.

Microstructures 44 and more generally, the structured surface 40 may be formed through any suitable process, such as a microreplication process. For example, smooth surface 38 may be formed through cutting (fly cutting, thread cutting, diamond turning, or the like), or pressing a compliant but curable or hardenable material against a suitable tool with a surface defining the negative of the desired structure. For example, microstructures 44 may be formed with a prism design tool that may include, for example, the following parameters as illustrated in FIG. 3: pitch (P), base length (B), base angles ($\theta_1$ and $\theta_2$), tip angles ($\Phi_1$ and $\Phi_2$), tip radius ($R_{tip}$), flat land width (w), fill fraction (B/P), aspect ratio (h/(B)), tip size fraction ($R_{tip}$/B) and/or the tip fraction ($R_{tip}$/P). The base angles and tip angles are the angles of the appropriate linear section (i.e., linear base section 481 or linear tip section 482) as measured with respect to the plane substantially perpendicular the display axis (the "base plane"). The tip linear fraction and base linear fraction are the ratios of the appropriate linear section as projected on the base plane to base length (i.e., tip linear fraction is D/B and base linear fraction is C/B. Polynomial blend section 483 spans the region between linear base section 481 and linear tip section 482. The boundary conditions at the tip end (point A) and the base end (point B) of polynomial blend section 483 are important parameters. The tip delta angle or base delta angle (also referred to herein as "blend angle change") is the difference in slope angle of polynomial blend section 483 to that of the linear section (i.e., linear tip section 482 or linear base section 481) as measured at boundary point A or B.

In some examples, the fill fraction is about 0.7 to about 0.95, or about 0.75 to about 0.9. In some examples, $\theta_1$ and $\theta_2$ are about 75 degrees to about 85 degrees, or about 77 degrees to about 82 degrees. In some examples, $\Phi_1$ and $\Phi_2$ are about 65 degrees to about 80 degrees, or about 69 degrees to about 77 degrees. In some examples, $R_{tip}$ is about 0.5 micrometers to about 5 micrometers. In some examples, the tip size fraction is about 0.01 to about 0.05. In some examples, the tip linear fraction is about 0.03 to about 0.15. In some examples, the base linear fraction is about 0 to 0.1. In some examples, the tip fraction is less than about 0.1 or less than about 0.035. In some examples, the aspect ratio is about 1.8 to about 2.5. In some examples, the tip delta angle is about 0 degrees to about 15 degrees. In some examples, the base delta angle is about −15 degrees to about 5 degrees. In some aspects the polynomial blend section is an order 3, 5 or 7 polynomial.

In some examples, prism design tool parameters may be varied to provide a structured surface 40 with desired light output distribution, e.g., a suitably wide and smooth output light distribution. In some examples, the microstructure forming process may be automated with a multi-parameter search and an optimization metric such as, for example, establishing a full-width, half maximum or a half-width, half maximum and varying the second derivative of luminance versus polar view angle to achieve a desired light output distribution. Other processes for forming lenticular diffuser 34 may also be possible including, for example, casting and curing with an electroplated, laser cut, or etched tool, using photolithography such as two-photon mastering of a tool in conjunction with a cast and cure process, or even direct machining or an additive three-dimensional printing process. The material may be subsequently hardened or cured (e.g., through exposure to light such as ultraviolet light), leaving structured surface 40 with the desired microstructures 44.

In some examples, structured surface 40 may define a plurality of substantially parallel grooves 42. In some examples, each of grooves 42 may be linear grooves, i.e., grooves 42 may extend along a plane that is substantially perpendicular to display axis 52 with substantially the same (e.g., the same or nearly the same) cross-sectional shape (e.g., as shown in the cross-sectional view of FIG. 1, and extending along a plane into/out of the page). In other examples, grooves 4 may be linear grooves extending along a plane parallel to the page (not shown in FIG. 1). In some examples, grooves 42 may be any suitable thickness.

In some examples, grooves 42 may be totally filled with material such that lenticular diffuser 34 may include substantially smooth surface 36. In some examples, grooves 42 may be filled partially with material such that the material in grooves 42 is adjacent to at least a portion of structured surface 40. In some examples, the material in grooves 42 may be any suitable material. For example, the material in grooves 42 may be a low refractive index material, air, an optical adhesive, silicones, fluorinated polymers and copolymers, nano-void air entrained ultra-low index material, or the like. In other examples, the material in grooves 42 may include more than one material, e.g., air and an optical adhesive, or the like.

In some examples, the material in grooves 42 may have a refractive index less than the refractive index of the material of microstructures 44. In some examples, the material filling grooves 42 may have a sufficiently low index of refraction, such as between about 1.3 and about 1.55, to facilitate total internal reflection over a sufficiently broad range of angles. In some examples, the difference between the refractive index of the material forming microstructures 44 and the refractive index of the material filling grooves 42 may be between 0.05 and 0.6, or between about 0.1 and 0.3, or between about 0.15 and 0.25.

The horizontal output distribution of optical system 10 may be described as luminance as a function of as view angle. Luminance as a function of as view angle may be described as having a half width at half maximum (HWHM), i.e., the view angle position on either side of the on-axis position at which the luminance is one-half of the maximum luminance (e.g., luminance at the on-axis position). In some examples, lenticular diffuser 34 may be configured to provide a greater than about ±40 degrees HWHM from an input light beam less than about ±30 degrees HWHM. For example, the shape, size, and pitch of microstructures 44 may be selected to provide a greater than about ±40 degrees HWHM from an input light beam less than about ±30 degrees HWHM. In other examples, lenticular diffuser 34 may be configured to provide a greater than about ±50 degrees HWHM from an input light beam less than about ±20 degrees HWHM. For example, the shape, size, and pitch of microstructures 44 may be selected to provide a greater than about ±50 degrees HWHM from an input light beam less than about ±20 degrees HWHM.

Luminance as a function of as view angle may also be described as having a half width at 80% maximum (HW80), i.e., the view angle position on either side of the on-axis position at which the luminance is 80% of the maximum luminance (e.g., luminance at the on-axis position). In some examples, lenticular diffuser 34 may be configured to provide a greater than about ±35 degrees HW80 from an input light beam less than about ±30 degrees HWHM. For example, the shape, size, and pitch of microstructures 44 may be selected to provide a greater than about ±35 degrees HW80 from an input light beam less than about ±30 degrees HWHM. In other examples, lenticular diffuser 34 may be configured to provide a greater than about ±40 degrees HW80 from an input light beam less than about ±20 degrees HWHM. For example, the shape, size, and pitch of microstructures 44 may be selected to provide a greater than about ±40 degrees HW80 from an input light beam less than about ±20 degrees HWHM.

In some examples, turning film 14 may include substantially smooth surface 16 (e.g., non-structured) and structured surface 18. In some examples, substantially smooth surface 18 may define display axis 52 extending substantially perpendicular to substantially smooth surface 16. In some examples, structured surface 18 may include a plurality of microstructures 19 each having first side 24 and second side 28 that intersect at vertex 26. In other examples, structured surface 18 may include more than two surfaces, e.g., a multifaceted microstructure. In some examples, microstructures 19 of structured surface 18 may define grooves 22. In some examples, grooves 22 may be substantially parallel. In some examples, turning film 14 may be optically coupled to backlight light guide 12. In some examples, turning film 14 may output light substantially collimated in a first plane.

In some examples, turning film 14 may be configured to receive substantially collimated light from backlight light guide 12 (e.g., light ray 54) and output light substantially collimated in a first plane (e.g., light ray 56). For example, turning film 14 may receive the substantially collimated light output from a turning film type lightguide, or a wedge or pseudo-wedge lightguide, or the like.

In some examples, substantially smooth surface 16 need not be completely smooth in all embodiments, and may qualify as a substantially smooth surface as long as the surface does not contain microstructures (e.g., non-structured surface). For example, an anti-wetout or anti-glare beaded coating may be included or incorporated on the surface of substantially smooth surface 16, and such a surface may still be considered substantially smooth. In other words, the term smooth is not used in the sense that the surface is non-rough or perfectly planar, but instead is used to indicate that the surface is non-structured.

In some examples, structured surface 18 may include prismatic microstructures 19. In other examples, structured surface 18 may include more than one microstructures 19, e.g., an angular microstructure, a multifaceted microstructure, or the like. In some examples, each of microstructures 19 may be linear microstructures, i.e., microstructures 19 may extend along a plane perpendicular to display axis 52 with substantially the same (e.g., the same or nearly the same) cross-sectional shape (e.g., as shown in the cross-sectional view of FIG. 1, and extending in an axis into/out of the page). In other examples, microstructures 44 may be linear microstructures extending in a plane parallel to the page (not shown in FIG. 1).

In some examples, each of microstructures 19 may have a first side 24 and a second side 28. In some examples, first side 24 and second side 28 may be similar. For example, each of first side 24 and second side 28 may have a single, straight facet, curved facet or the like. In other examples, first side 24 and second side 28 may be dissimilar. For example, each of first side 24 and second side 28 may have a different number of facets, or may be multifaceted, or the like. In other examples, first side 24 or second side 28 may be curved or arcuate to form a suitable light output distribution from the substantially collimated input distribution. In that sense, first side 24 may preferentially reflect light in a first direction and second side 28 may preferentially reflect light in a second direction. The overall arrangement of microstructures 19 on structured surface 18 may have any suitable pitch and may or may not have land (flat areas; not shown) between adjacent microstructures. In some examples, microstructures 18 may be directly adjacent to one another such that a microstructure creates a shadowing effect on an adjacent microstructure.

Microstructures 19 may be any appropriate size. In some examples, microstructures 19 may be on the millimeter or micrometer scale, e.g., pitch of microstructures 19 between about 10 and about 200 micrometers or between about 10 and about 100 micrometers. The pitch or size of asymmetric microstructures 19 may increase, decrease, both increase and decrease, or remain constant for all or portions of structured surface 18 of turning film 14. In some examples, microstructures 19 may all be substantially the same (e.g., the same or nearly the same) or may include a combination of microstructures that are different shapes or sizes.

Turning film 14 may be any suitable thickness and may be made from any suitable material. In some examples, microstructures 19 of turning film 14 may be formed from a polymeric material, such as polycarbonate, polyethylene terephthalate, polyethylene naphthalate, poly (methyl methacrylate) and copolymers and blends of the same. Other appropriate materials include acrylics, polystyrenes, methyl styrenes, acrylates, polypropylenes, polyvinyl chlorides, and the like. In some examples, turning film 14 may be optically transparent or have low haze and high clarity to avoid undesirably scattering incident light. In some examples, the material forming microstructures 19 of turning film 14 may have a sufficiently high index of refraction, such as between about 1.5 and about 1.75, to facilitate total internal reflection at a sufficiently broad range of angles. In some examples the material, dimensions, or both of turning film 14 may be selected to produce a flexible film. In some examples, useful materials for the microstructures of turning film 14 are those described in U.S. Pat. No. 9,360,592.

Microstructures 19, and more generally, the structured surface 18 may be formed through any suitable process, such as a microreplication process. For example, structured surface 18 may be formed through cutting (fly cutting, thread cutting, diamond turning, or the like), or pressing a compliant but curable or hardenable material against a suitable tool with a surface defining the negative of the desired structure. The material may be subsequently hardened or cured (for example, through exposure to light such as ultraviolet light), leaving structured surface 18 with the desired microstructures 19. Other processes for forming turning film 14 may also be possible including, for example, casting and curing with an electroplated, laser cut, or etched tool, using photolithography such as two-photon mastering of a tool in conjunction with a cast and cure process, or even direct machining or an additive three-dimensional printing process.

In some examples, backlight light guide 12 may include one or more of any suitable light sources or combinations of light sources (not shown). In some examples, the light source may include one or more light emitting diodes (LEDs). In some examples, the light source may each include a singular light source or may include a plurality of light sources (e.g., a bank or series of light sources). In some examples, the light source may include cold cathode fluorescent lights (CCFLs) or incandescent light sources. The light sources and any corresponding injection, collimation, or other optics may be selected to provide any suitable wavelength or combination of wavelengths, polarizations, point spread distributions, and degrees of collimation.

In some examples, backlight light guide 12 may be configured to output substantially collimated light, e.g., substantially collimated light output may include a light output having a full-width half maximum (FWHM) of less than about 40 degrees. For example, backlight light guide 12 may include a turning film lightguide including a wedge lightguide to extract light by gradual frustration of total internal reflection such that light may be output from backlight light guide 12 along display axis 52 in the down-guide direction at high angles. As another example, backlight light guide 12 may include a pseudo-wedge including a flat lightguide having shallow sloped extractor shapes to weakly frustrate total internal reflection such that the extracted light may be collimated at high angles from backlight light guide 12 substantially parallel display axis 52 in the down-guide direction. In such examples, the density and area fraction of such extractors (i.e., surface area of extractors to total surface area of the backlight light guide) may be arranged to uniformly emit light and substantially extract light from the backlight light guide 14 along its length. Additionally, in such examples, backlight light guide 12 may include lenticular and/or prismatic grooves or structures on one side along the light propagation direction to scatter the propagating light, break up source image artifacts, or substantially collimate the light in the cross-guide direction (i.e., the light may be substantially collimated in both the down-guide and cross-guide directions).

In some examples, substrate 30 may be disposed between turning film 14 and lenticular diffuser 34. In some examples, optical system 10 may not include substrate 30, e.g., turning film 14 may be directly adjacent and optically coupled to lenticular diffuser 34. In some examples, substrate 30 may be an optical adhesive, polyethylene terephthalate, polycarbonate, or the like. In some examples, turning film 14 and lenticular diffuser 34 may be disposed on and optically coupled to opposite sides of substrate 30. In other examples, turning film 14 and lenticular diffuser 34 may be disposed on and optically coupled to two separate substrates, where the two substrates are laminated together or otherwise optically coupled.

In some examples, liquid crystal display (LCD) 50 may be disposed adjacent lenticular diffuser 34. In some examples, LCD 50 may be disposed adjacent and optically coupled to lenticular diffuser 34. In some examples, other layers (not shown) may be disposed between LCD 50 and lenticular diffuser 34, each layer being optically coupled to each adjacent layer. Other layers may include, for example, an optical adhesive, polyethylene terephthalate, polycarbonate, or the like.

In some examples, optical system 10, 11 may be mounted in a vehicle. For example, a vehicle display system may include backlight light guide 12, turning film 14, lenticular diffuser 34 and LCD 50. In other examples, a vehicle display system may include turning film 14 and lenticular diffuser 34.

Figure 2A:
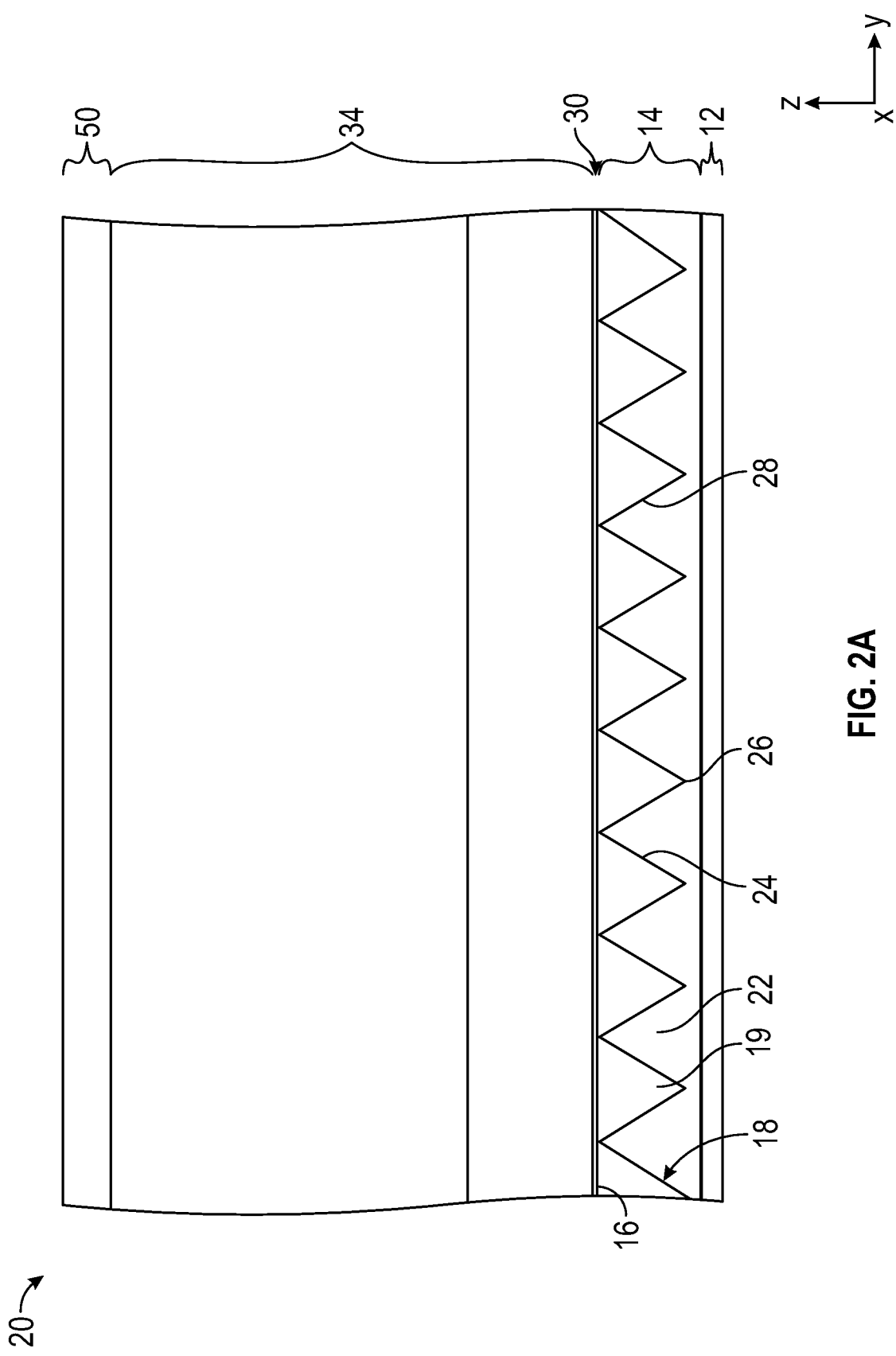
FIG. 2A is a conceptual and schematic lateral cross-sectional view of an example optical system in the YZ plane.
Figure 2B:
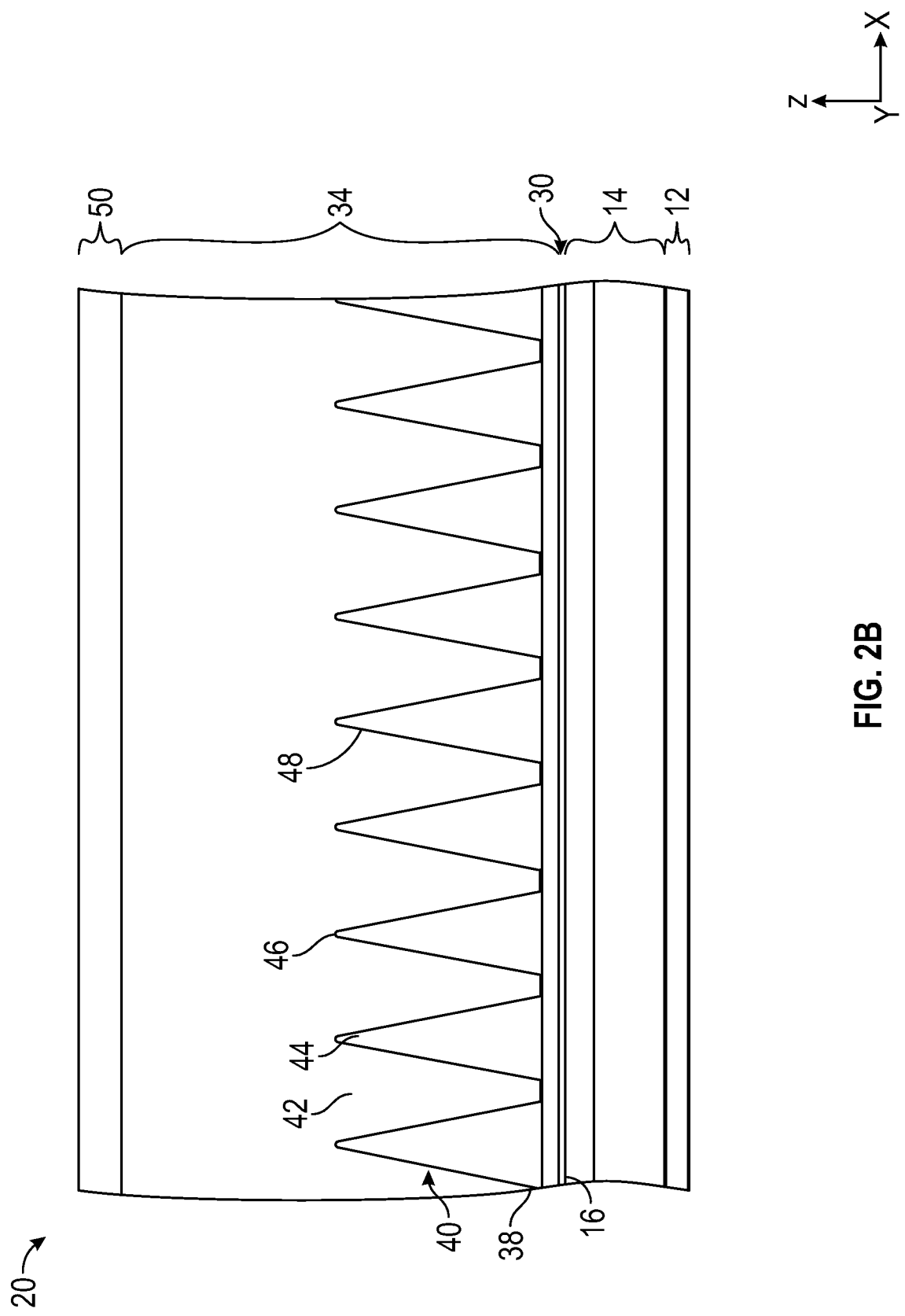
FIG. 2B is a conceptual and schematic lateral cross-sectional view of an example optical system in the XZ plane.

FIGS. 2A and 2B are conceptual and schematic lateral cross-sectional views of an example optical system 20 in the YZ plane (FIG. 2A) and the XZ plane (FIG. 2B). Optical system 20 of FIGS. 2A and 2B may be substantially the same as optical system 10 of FIG. 1 and incorporates the description of elements above with respect to FIG. 1. In the examples of FIGS. 2A and 2B, optical system 20 may include backlight light guide 12, turning film 14, substrate 30, lenticular diffuser 34 and liquid crystal display (LCD) 50.

As shown in FIGS. 2A and 2B, optical system 20 may be disposed in the XY plane with the X-axis representing the horizontal axis relative to optical system 20 surface, the Y-axis representing the vertical axis relative to optical system 20 surface, and the Z-axis representing the display normal. As shown in FIG. 2A, grooves 22 of turning film 14 may be disposed substantially perpendicular to the YZ plane (i.e., substantially parallel to the X-axis). As shown in FIG. 2B, grooves 42 of lenticular diffuser 34 may be disposed substantially perpendicular to the XZ plane (i.e., substantially parallel to the Y-axis). In some examples, grooves 22 of turning film 14 may be substantially perpendicular to grooves 42 of lenticular diffuser 34.

In some examples, turning film 14 may output light collimated in the YZ plane. In some examples, lenticular diffuser 34 reflect or refract collimated light from turning film 14 away from the Z-axis toward the X-axis plane. In some examples, the position of grooves 42 of lenticular diffuser 34 relative to grooves 22 of turning film 14 may spread light in the horizontal direction relative to a display surface.

Example LCFs and optical systems that include the same according to the disclosure provide will be illustrated by the following non-limiting examples.

EXAMPLES

Objects and advantages of this invention are further illustrated by the following examples, but the particular materials and amounts thereof recited in these examples, as well as other conditions and details, should not be construed to unduly limit this invention.

In general, the hybrid lenticulars shown in the following examples are high aspect ratio, multifaceted shapes that produce display systems having viewing output which simultaneously satisfies (1) wide in viewing angle, (2) flat display intensity across the viewing range and (3) sharp cut-offs on either side of the viewing angle range. The example outputs from differing lenticular structures are calculated with baseline assumptions for the other elements of the display system in order to define lenticular structures suitable to produce wide, flat and sharply defined viewing ranges. These are commonly referred to as "top-hat" profiles because of their characteristic shape.

Model Assumptions

Figure 4A:
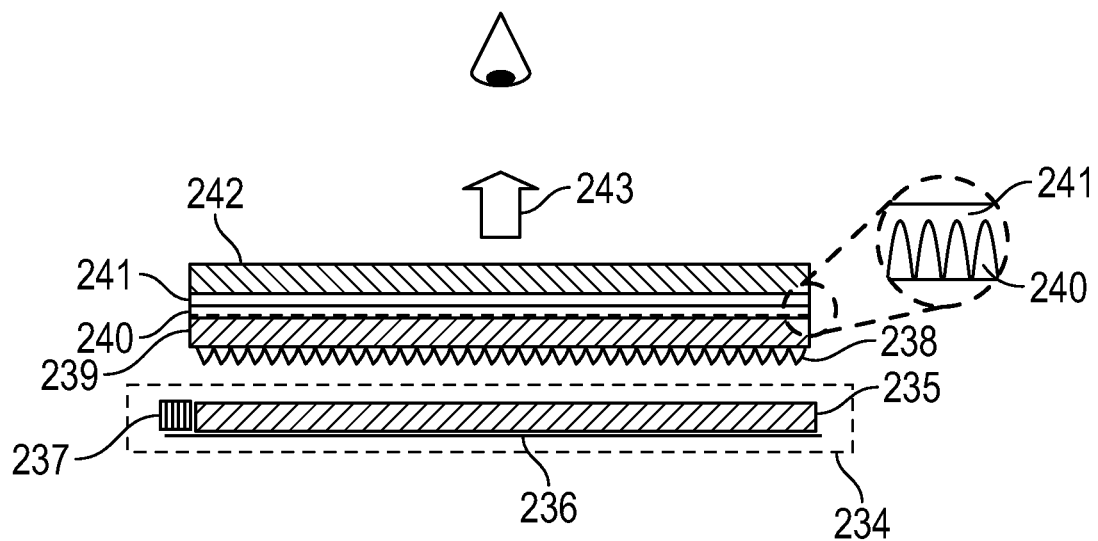
FIG. 4A is a conceptual and schematic lateral cross-sectional view of an example optical display system.

The non-sequential optical ray-tracing package used for this study is functionally equivalent to commercial package available from LightTools, Pasadena, Calif., using standard methods of reverse-ray tracing and Monte-Carlo splitting as are common in the industry. The particular optical system of this invention is shown in FIG. 4A. It is a turning film system in which the turning film had prisms 238 toward the light-guide assembly and a set of orthogonal lenticular features 240 on a second substrate 271 and facing the first substrate 239. The exact nature of the turning film has not been found to be particularly important to the performance of the spreader, but for these examples the model uses a turning prism with an input face angle of 65.0 deg, a base angle of 66.15, a tip angle of 50.19, a base fraction of 0.1525, a tip fraction of 0.03422, and a curvature factor of 1.419. The turning prisms are assumed to have a real refractive index of refraction 1.565 and an imaginary part of 9.104E-7 at 550 nm wavelength. The first substrate 239 is assumed to have a refractive index of 1.61, and absorption coefficient of 0.0191 per mm, and thickness of 127 micrometers.

Figure 4B:
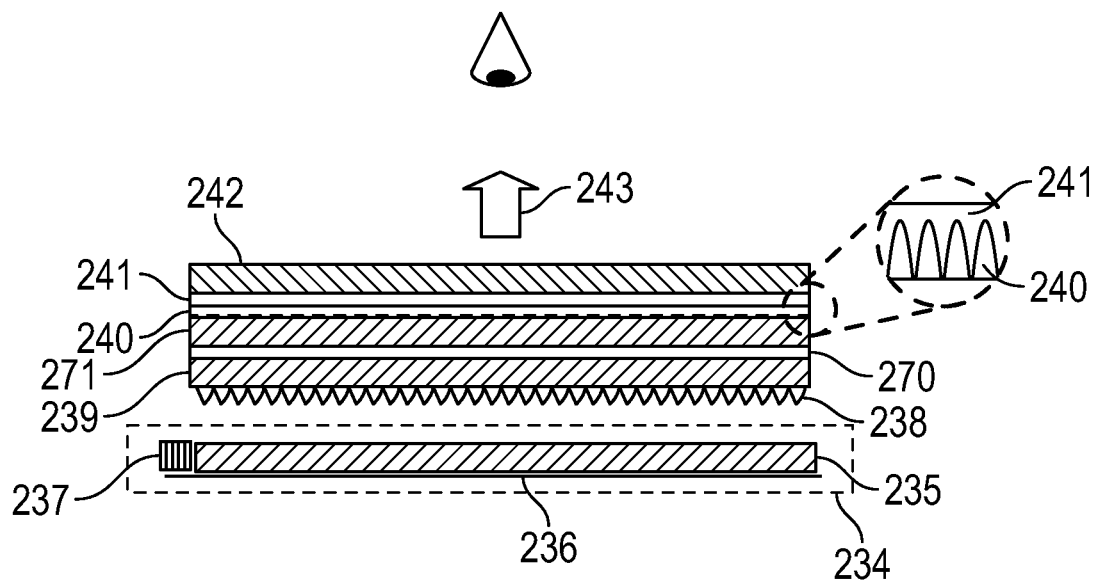
FIG. 4B is a conceptual and schematic lateral cross-sectional view of an example optical display system.

The lenticular features may either be formed directly on the first substrate, as shown in FIG. 4A, or on the second substrate 271 (shown in FIG. 4B) of index 1.61 and absorption coefficient 0.0191 l/mm and a thickness of 50.8 micrometers and then laminated to the first substrate by an adhesive 270 of index 1.486 and thickness of 25.4 micrometers. When using high (optical) quality materials the performance of either approach is expected to be quite similar. The lenticular feature is assumed to have an index of refraction of 1.68 and an absorption coefficient of 0.0104 per mm. The lenticular spreader surface is bonded to the rear polarizer of the display with an adhesive 241 of index of refraction of 1.486 and a thickness of about 100 micrometers such that the adhesive fully fills the lenticular features.

The simplified model of the display module 242 is described as follows. It assumes a transmission of the rear polarizer in pass state of 0.95 and in the block state of 0.001, and an internal module back reflection of 0.001, a material index of 1.5, and scattering resulting from a surface deviation of 9 degrees at the exiting air boundary. The actual slope distribution of this 9 degree deviation would be similar to that of a partial sphere surface deviation. The display module 242 was exemplary only and could have been omitted or could have had other values.

Figure 5:
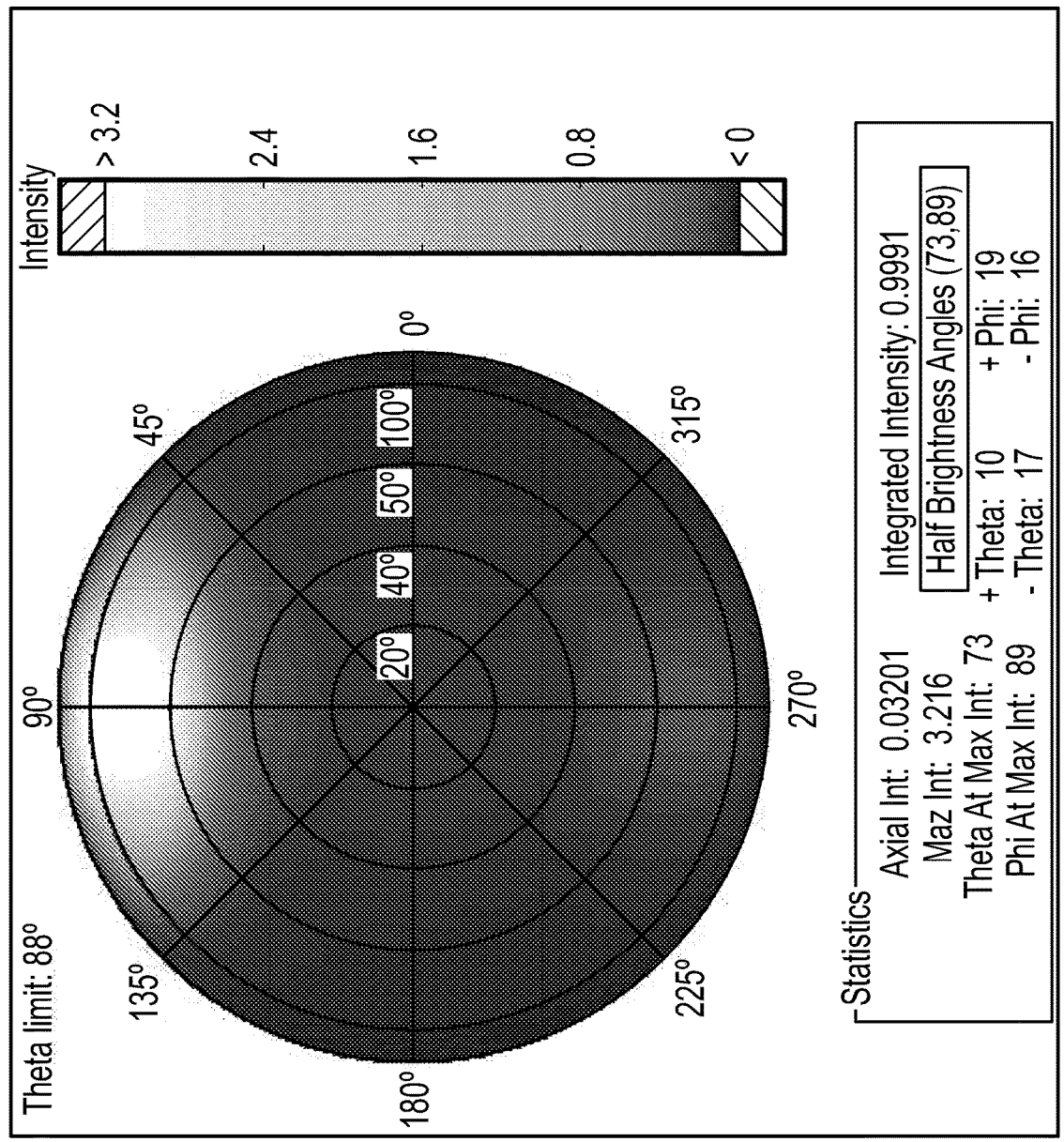
FIG. 5 is a conoscopic plot.
Figure 6:
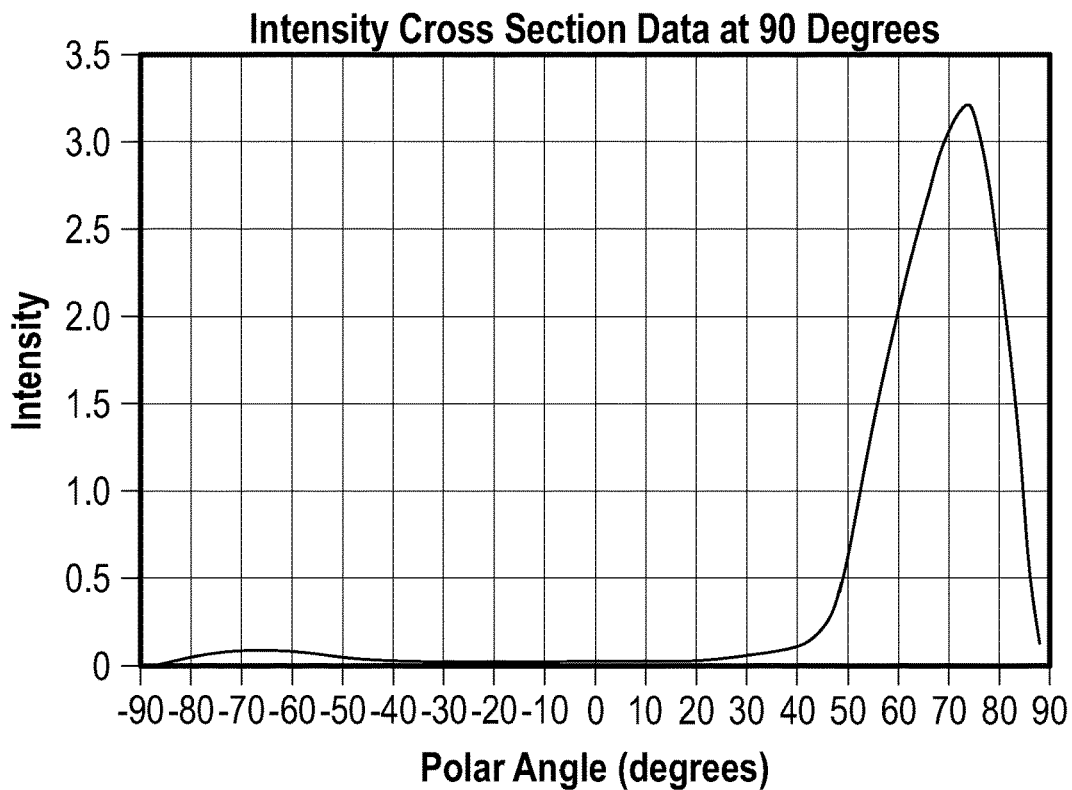
FIG. 6 is a luminance cross section plot.
Figure 7:
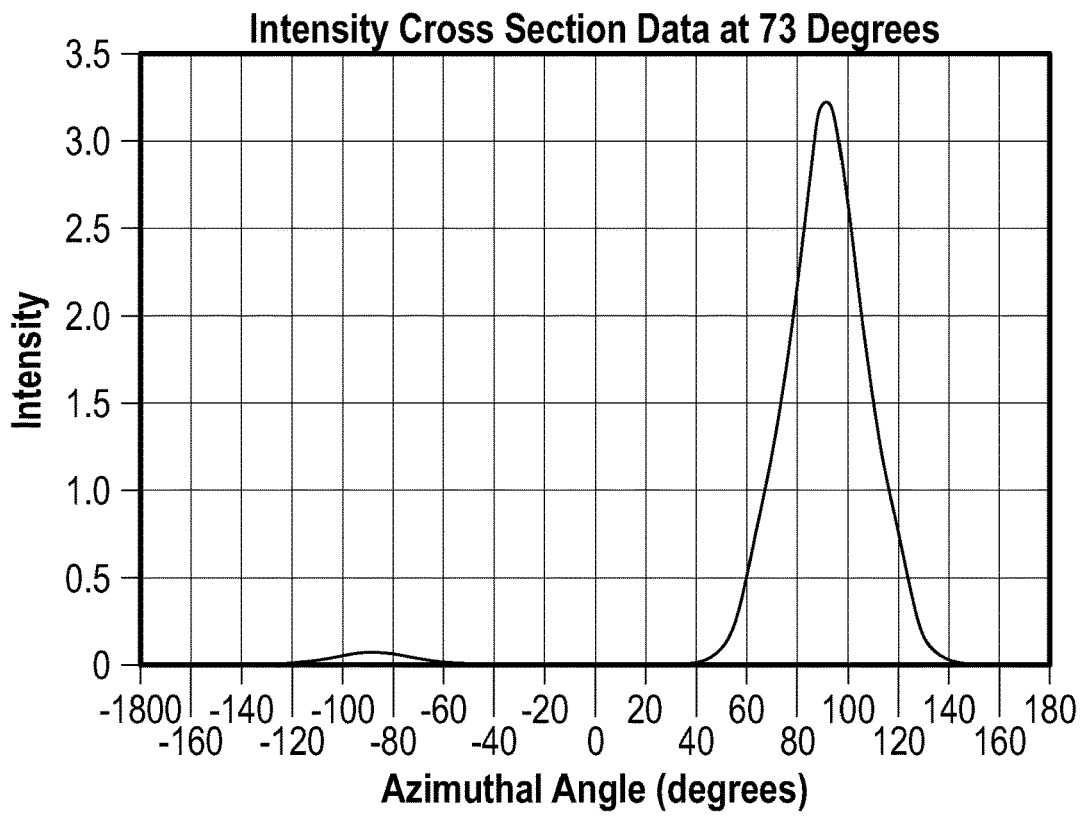
FIG. 7 is a luminance cross section plot.

With respect to FIG. 4A, system performance can depend on the output distribution from the light-guide assembly 234 and this can vary depending on the design of the various components of that assembly. In practice vertical angular output (and hence turning film design goals) can vary significantly with source distribution, while horizontal angular profile (and hence spreader design) is usually far less sensitive. Such a light-guide assembly for example can be made up of a variety of components including one or more sources 237, a suitable light-guide with output coupling means 235, and a back-reflector 236. For the purposes of this discussion we consider output distribution 201 of the light-guide assembly 234. Output distribution 201 is shown in FIG. 5. The down-guide cross-section of this output distribution is shown in FIG. 6. The cross-guide cross-section is shown in FIG. 7. The modeling, here, assumes a light-guide assembly with the chosen distribution and a reflectance optical property (looking back into the assembly) of 0.965 specular and 0.02 lambertian characteristic. These values and distributions are for example purposes only, and the following design approach can be used with other reflectance values and other light distributions.

In particular, the distribution 201 was derived from a measurement of a physical sample (obtained from an actual Dell XPS laptop) using a RiGO photogoniometer system. The RiGO system was used to measure both spatial and angular luminance data which was, subsequently, converted into a suitable light source for modelled example comparisons of spreader structures.

Modelled Results

Modelling output are provided for each of the examples described with common system assumptions in order to make comparison plots. The coordinate systems used in the conoscopic plots in FIG. 5 has the down-guide direction toward the 90 degree azimuthal angle and the source edge (for example LED edge) is toward the 270 degree azimuthal angle. For the luminance cross-section plots (FIG. 6, for example), the down-guide direction is plus and the source edge is minus. When used in an actual vehicle display system, the cabin coordinate system typically has + up and down and may or may not match the directions shown in the luminance cross-section plots. In fact, for the turning film generated top-hat distributions, these typically have a sharper cutoff on the minus side of the distribution, which implies that the minus direction in our down-guide luminance distributions is preferably toward the plus direction in cabin coordinates (i.e. up). For the horizontal cross-section plots, the + direction is generally to the right side of the display if down guide is considered up. In fact, most of the following horizontal cross-section plots are quite symmetric, so direction is not so important. For comparisons, the plots for examples typically include a reference curve which has a flat top of +/−40 degrees angular viewing width and a transition zone that is 30 degrees wide. The embedded lenticular structures for spreading function described in these examples here can function well with design viewing able width even exceeding 40 degree width while maintaining sharp cut-off.

General Lenticular Spreader Shape

As discussed above, FIG. 3 shows generic version of inventive new design shape. In FIG. 3, the slope appears to be continuous between the blend and linear sections. More preferably, we have discovered advantages for structures having a slope discontinuity between these sections. The blend shape can be based on many functional forms, but we have discovered polynomial blends of order 3, 5, and 7 to be particularly useful. These forms allowed us constrain slope, curvature, and rate of change of curvature at the blend ends and indirectly along the blend. The particular forms for each of the example profiles and their respective modelled display performance are reported below.

Example and Comparative Examples

TABLE 1

| Overview of Example and Comparative example structures | | | | | | | |
|---|---|---|---|---|---|---|---|
| Example > | CE 1 | CE 2 | Exam 1 | Exam 2 | Exam 3 | Exam 4 | Exam 5 |
| Form | Simple Radius | Linear-Cubic-Linear | Linear-7th Order-Linear | Linear-7th Order | Linear-Cubic-Linear | Linear-Cubic-Linear | Linear-Cubic-Linear |
| Discontinuous Slope | No | No | Yes | Yes | Yes | Yes | Yes |
| Fill Fraction | 0.912 | 0.862 | 0.902 | 0.886 | 0.842 | 0.867 | 0.917 |
| Tip Radius (mm) | .00085 | 0.001180 | 0.001644 | 0.001356 | 0.000984 | 0.001859 | 0.000954 |

TABLE 1-continued

Overview of Example and Comparative example structures

| Example > | CE 1 | CE 2 | Exam 1 | Exam 2 | Exam 3 | Exam 4 | Exam 5 |
|---|---|---|---|---|---|---|---|
| Tip Angle (deg) | n.a. | 72.26 | 71.16 | 69.60 | 76.53 | 75.70 | 70.61 |
| Tip Linear Fraction | n.a. | 0.0438 | 0.1151 | 0.0766 | 0.0752 | 0.0984 | 0.1196 |
| Base Angle (Deg) | n.a. | 81.41 | 81.36 | 79.54 | 79.42 | 78.90 | 77.69 |
| Base Linear Fraction | n.a. | 0.006 | 0.025 | 0.000 | 0.068 | 0.052 | 0.050 |
| Aspect Ratio | 2.417 | 2.242 | 2.002 | 2.019 | 2.354 | 2.232 | 1.927 |
| Blend Angle Change at A (deg) | n.a. | 0 | 12.17 | 8.69 | 2.57 | 6.17 | 11.1 |
| Blend Second Derivative Factor at A | n.a. | NA | 0.078 | −1.019 | NA | NA | NA |
| Blend Third Derivative Factor at A | n.a. | NA | 0.000 | −0.432 | NA | NA | NA |
| Blend Angle Change at B (deg) | n.a. | 0 | −14.57 | −9.94 | 1.24 | −2.85 | −12.2 |
| Blend Second Derivative Factor at B | n.a. | NA | 0.308 | 0.915 | NA | NA | NA |
| Blend Third Derivative Factor at B | n.a. | NA | 0.000 | 0.322 | NA | NA | NA |

Table 1 shows detailed shape parameters of the spreader shapes presented in FIGS. 8-14. All of the blends used a 44.4 micrometer period and a radius shaped tip. Typically, periods will be between 10 and 200 micrometers, and more commonly between 14 and 80 micrometers; over these ranges our models have shown similar results. The lenticular feature shape also generally includes two linear sections with a blend of some polynomial shape between these sections. The "Discontinuous Slope" row indicates if the shape allowed for a slope change between the linear sections and the polynomial blend section. In our example we use polynomials of various order. For cubic shapes knowing the starting and ending angles is sufficient to define the shape. For higher order curves such a $5^{th}$ order or $7^{th}$ order polynomials, one can specify their additional shape parameters using higher order derivatives such as $2^{nd}$ and $3^{rd}$ derivatives at each end. In particular the table shows the $2^{nd}$ and $3^{rd}$ derivatives for the $7^{th}$-order polynomial shapes, but for cubic shapes these are not needed to fully specify the shape. For polynomials, generally, one has to start with the $2^{nd}$ derivative and include all derivatives out to (N−1)/2 derivative order where N is the order of the polynomial. The position and $1^{st}$ derivative conditions are already specified by other parameters in the table. The units used to specify these derivatives and the functional form of the blend are also important in determining the exact shape based on specified parameters. We define the blends in an X-Y coordinate system where the X value ran from −1 to 1, and the Y-axis is pointed in the outward direction of the shape surface and the A point corresponds to x=−1 and the B point x=1. The derivative factors in the table are defined in this coordinate system. The blend shape is mapped form this coordinate system onto the actual shape scaling uniformly the X and Y directions and then rotating so that the A and B points match. One of skill in the art will understand there are other functional forms that could be used to provide comparable results.

The examples used a mix of $3^{rd}$, and $7^{th}$ order polynomials. Allowing slope discontinuities between the blend and linear section is more important than the order of the polynomial. A design allowing for higher order polynomials allows more degrees of freedom and has the potential of being somewhat flatter, but this effect is not so large. We found that $3^{rd}$ order curves were often good enough and are simpler to design.

The "Form" line in the table indicates the basic shape of the non-tip radius part of the spreader starting on the tip side of the shape. Comparative examples CE1 and CE2 designs do not include discontinuities at the point where linear segments of the structure profiles meet with blend portions. Comparative example 1 (CE1) is of the form a simple radius with no linear sections. Comparative example 2 (CE2) as well as examples 3, 4 and 5 are of the form linear-cubic-linear meaning that the base of the structure has a first linear portion melding into a second portion with cubic polynomial shape melding into a third linear portion before melding into tip radius portion. Example 1 is of the form linear-$7^{th}$ order-linear meaning that the base of the structure has linear shape melding into $7^{th}$ order polynomial portion melding into a second linear portion before melding into a tip radius portion. Example 2 is of the form linear-$7^{th}$ order meaning that the base of the structure has a $7^{th}$ order polynomial portion before melding into the tip linear portion which melds into the tip radius portion.

Model Output Results

Figure 8A:
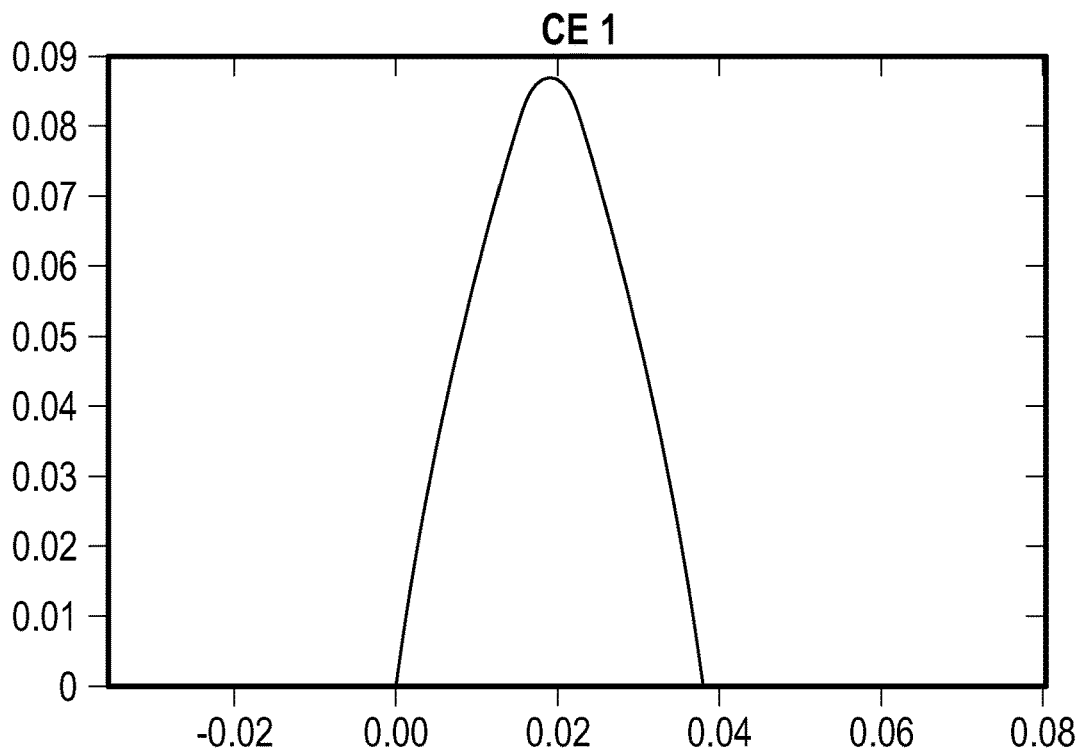
FIG. 8A is a geometric profile of a spreader structure.
Figure 8B:
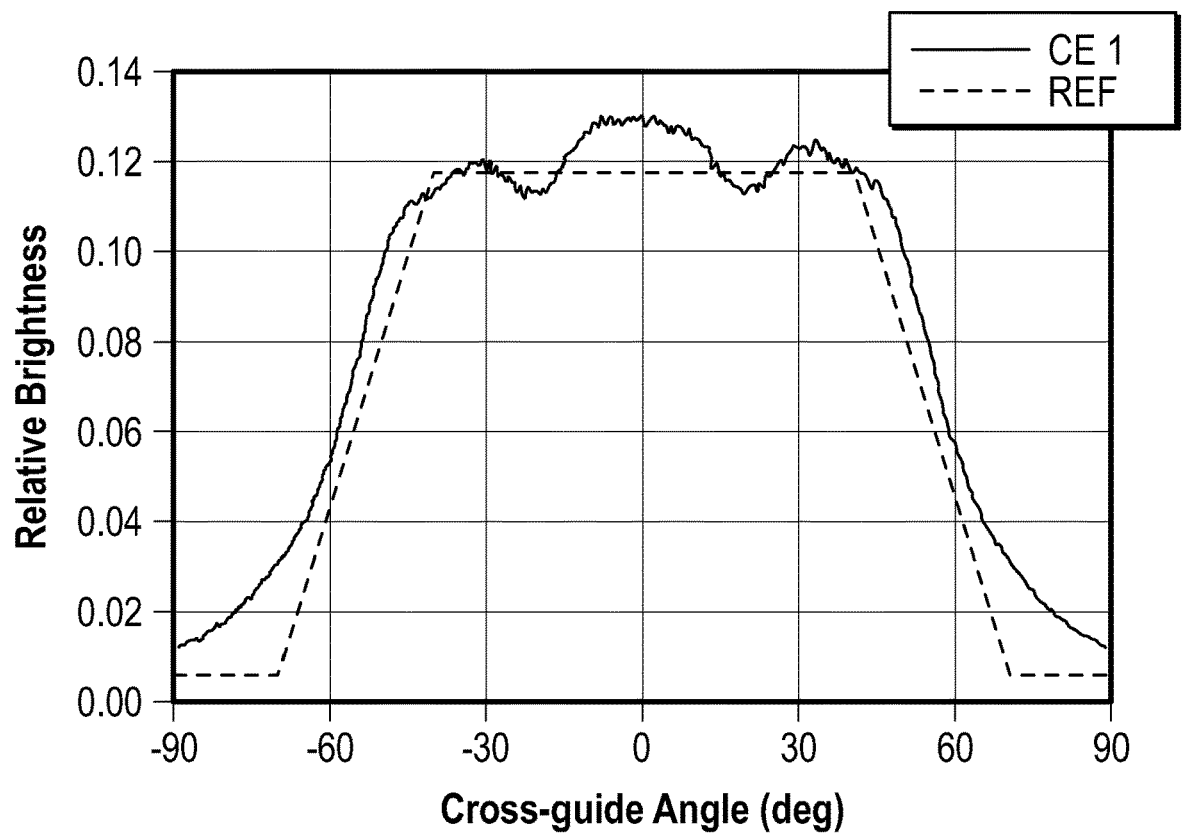
FIG. 8B is a plot of luminance distribution.
Figure 9A:
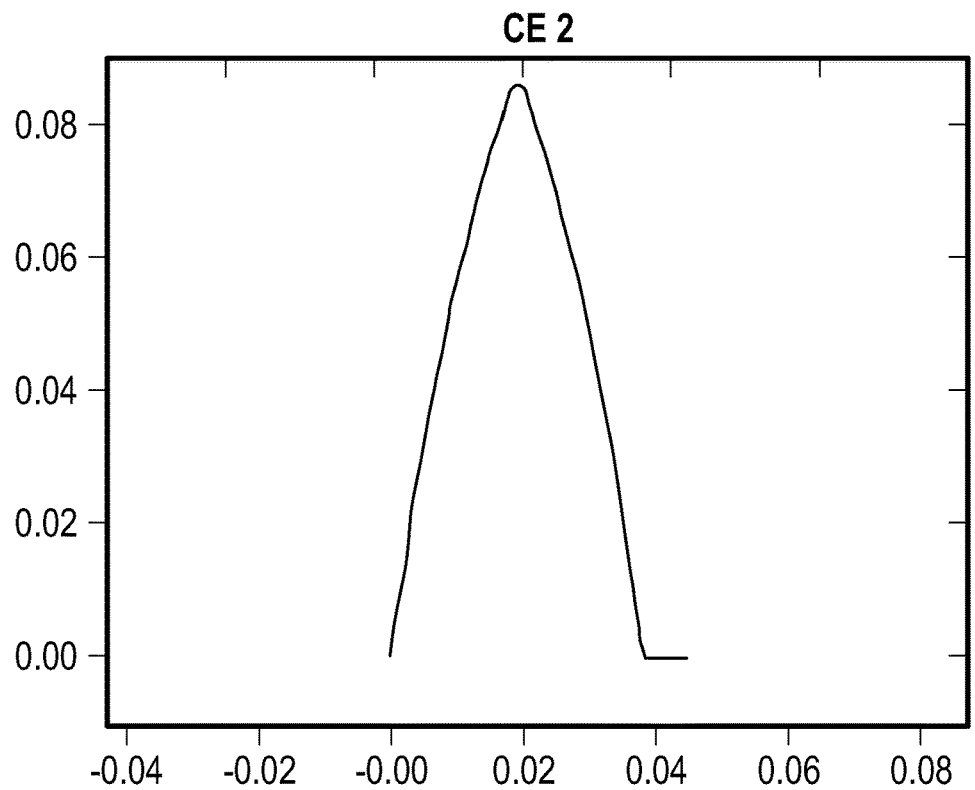
FIG. 9A is a geometric profile of a spreader structure.
Figure 9B:
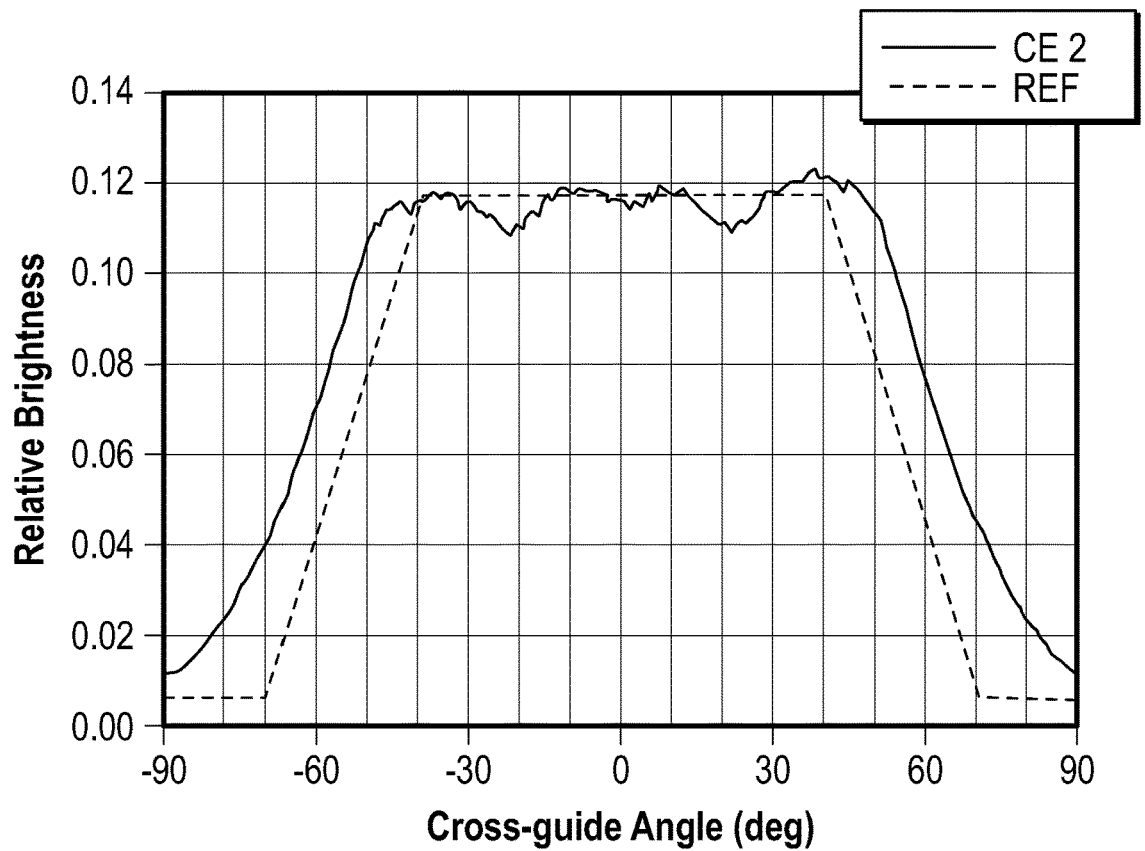
FIG. 9B is a plot of luminance distribution.

FIGS. 8A, B-14A, B each show two plots where one plot is the geometric profile of the spreader structure and the second shows the corresponding horizontal angular luminance distribution across the illumination system. From these profiles and luminance profiles, we may draw conclusions about the features for the lenticular structures which provide best performance for a wide flat (angular) viewing condition FIG. 8A shows one example of a prior design. As shown in FIG. 8B it has quite wide a viewing angle but the flat top does not extend much past 45 degrees and it has oscillations which are detrimental to perceived image quality. FIGS. 9A and B show a new improved design that is much wider and extends to at least 50 degrees and has better top flatness, but still with undesirable ripples in output luminance with viewing angle.

Figure 10A:
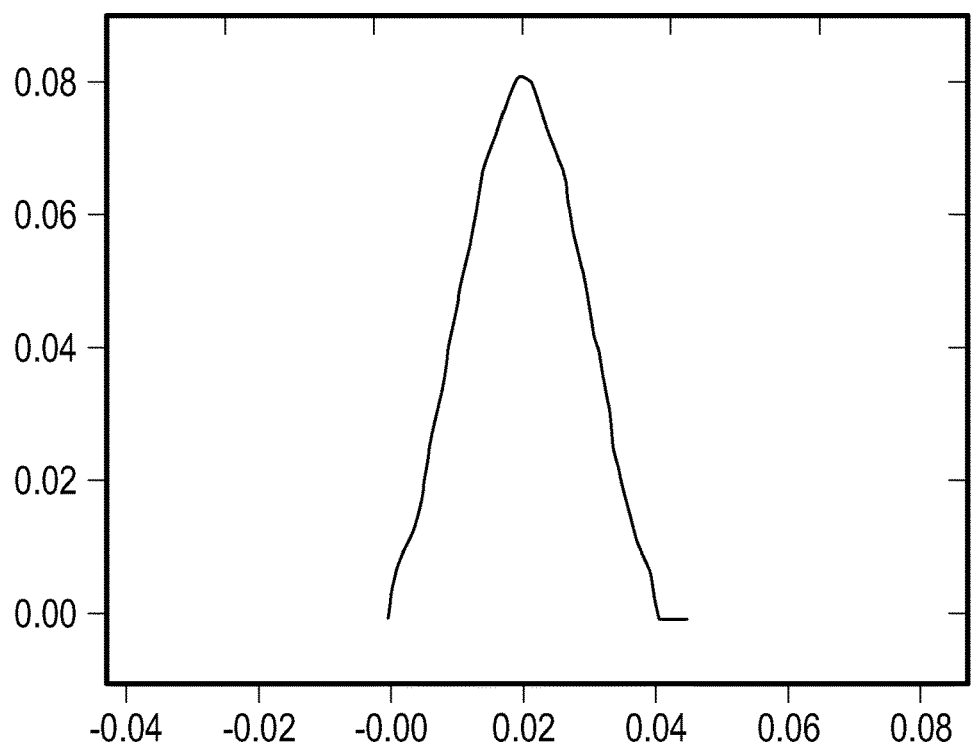
FIG. 10A is a geometric profile of a spreader structure.
Figure 10B:
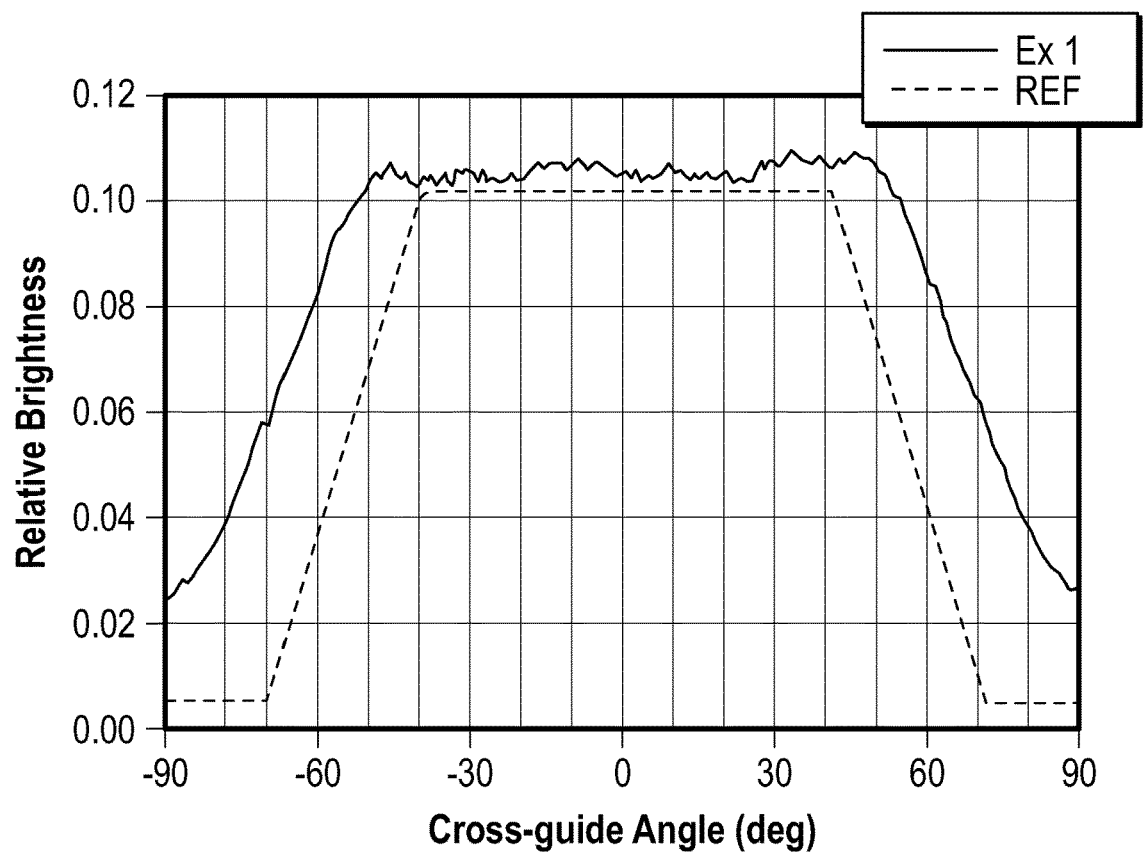
FIG. 10B is a plot of luminance distribution.
Figure 11A:
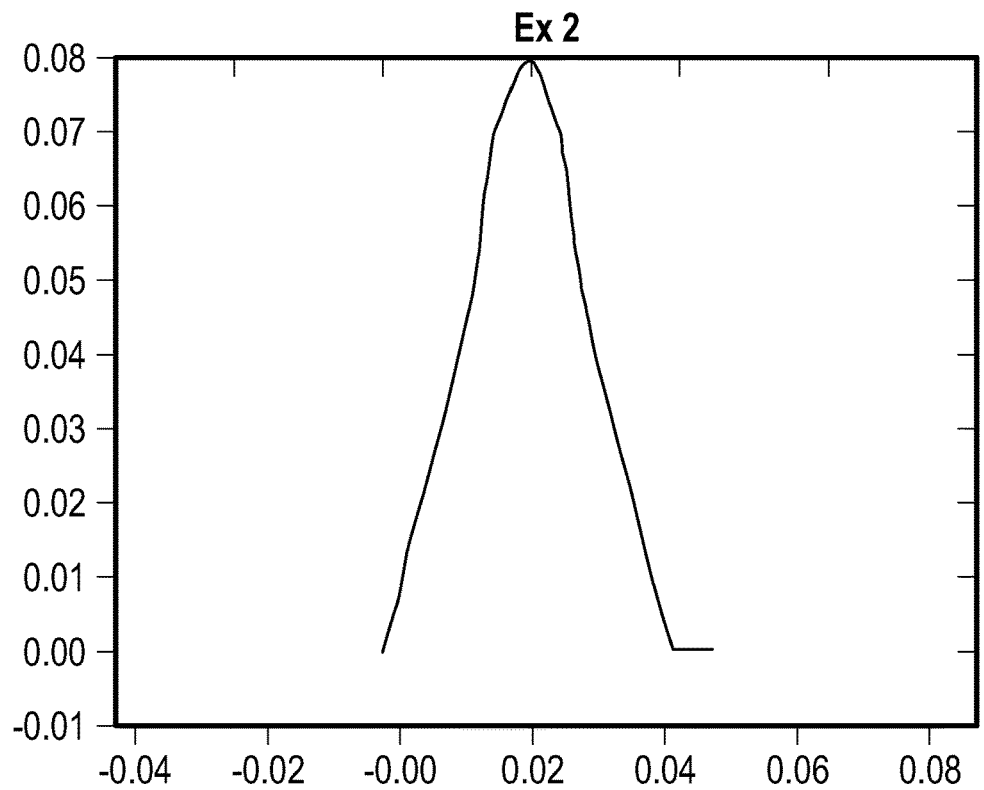
FIG. 11A is a geometric profile of a spreader structure.
Figure 11B:
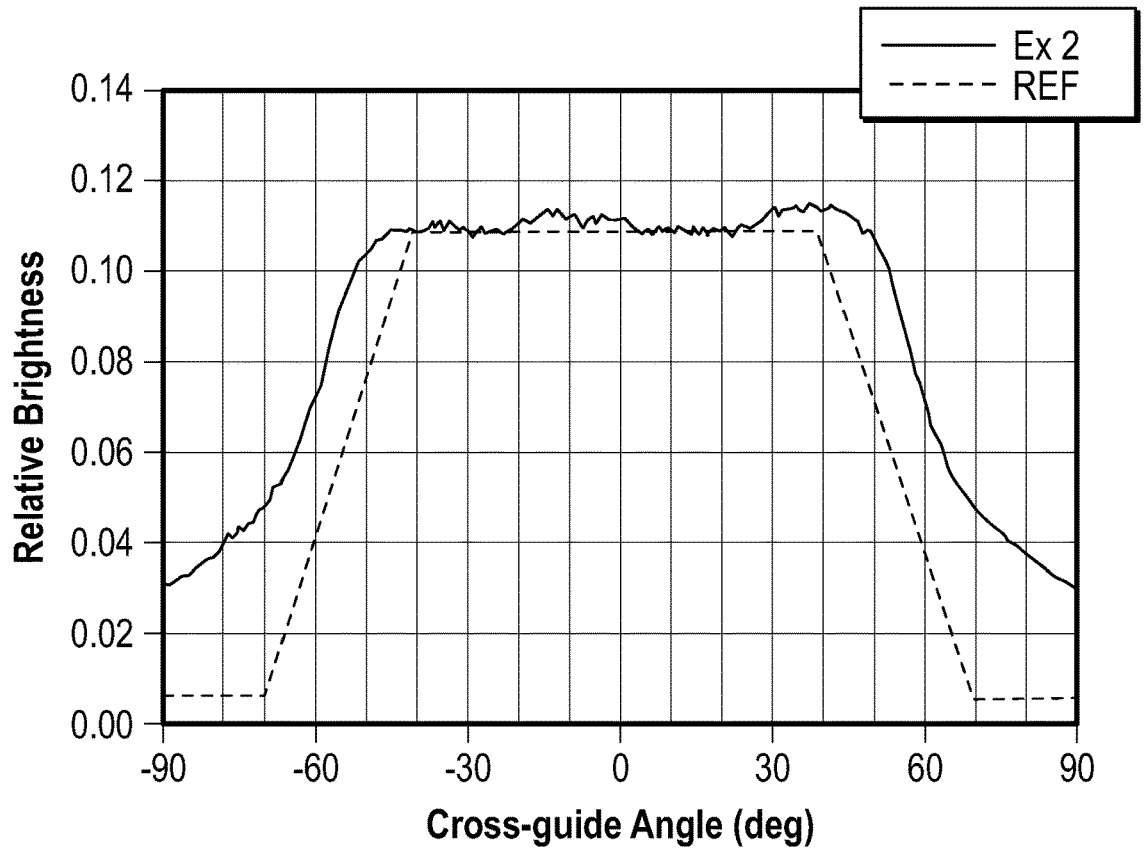
FIG. 11B is a plot of luminance distribution.

This design, in particular, matched slope between the blend and linear sections of our new shape. FIGS. 10A and B show improvements when slope discontinuities are incorporated in the design between the linear and blend sections. The luminance pattern in this case is very uniform with viewing angle. FIGS. 11A and B show another shape that produces a reasonably flat profile out to 50 degrees but it only includes one linear section the tip linear section together with a slope discontinuity.

Figure 12A:
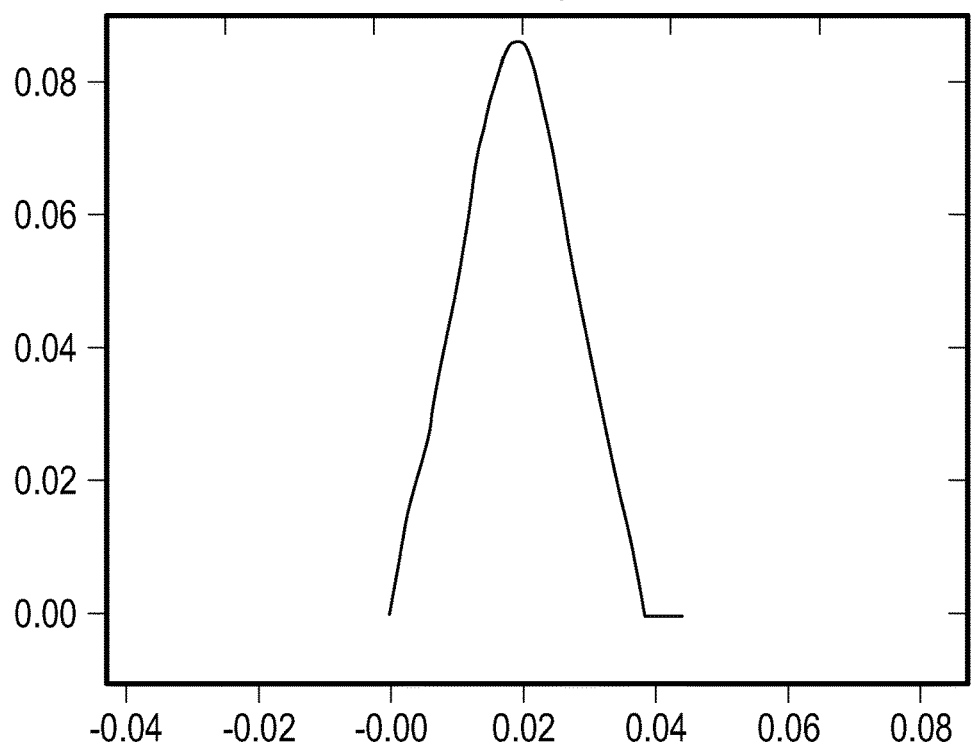
FIG. 12A is a geometric profile of a spreader structure.
Figure 12B:
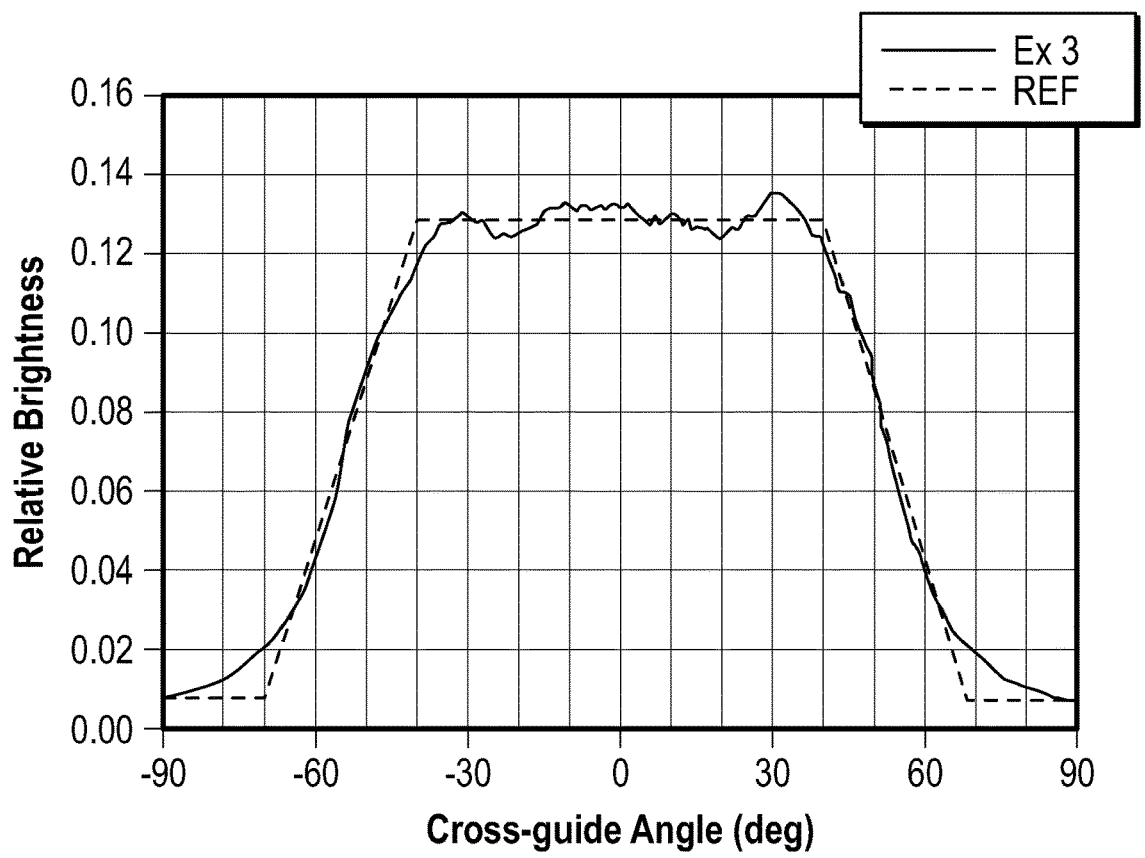
FIG. 12B is a plot of luminance distribution.
Figure 13A:
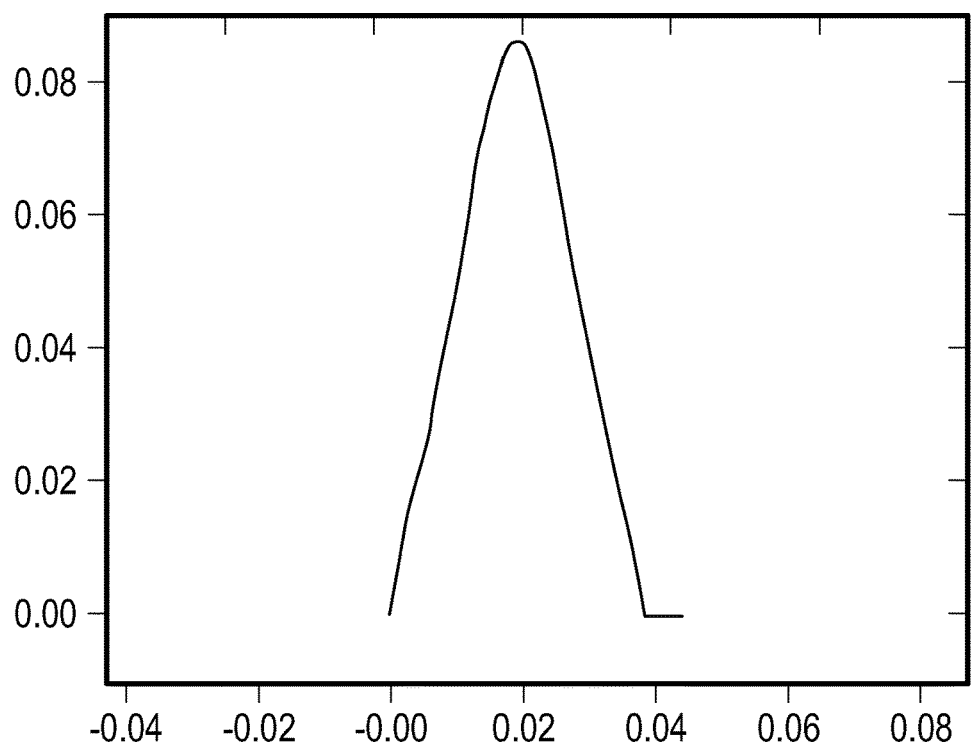
FIG. 13A is a geometric profile of a spreader structure.
Figure 13B:
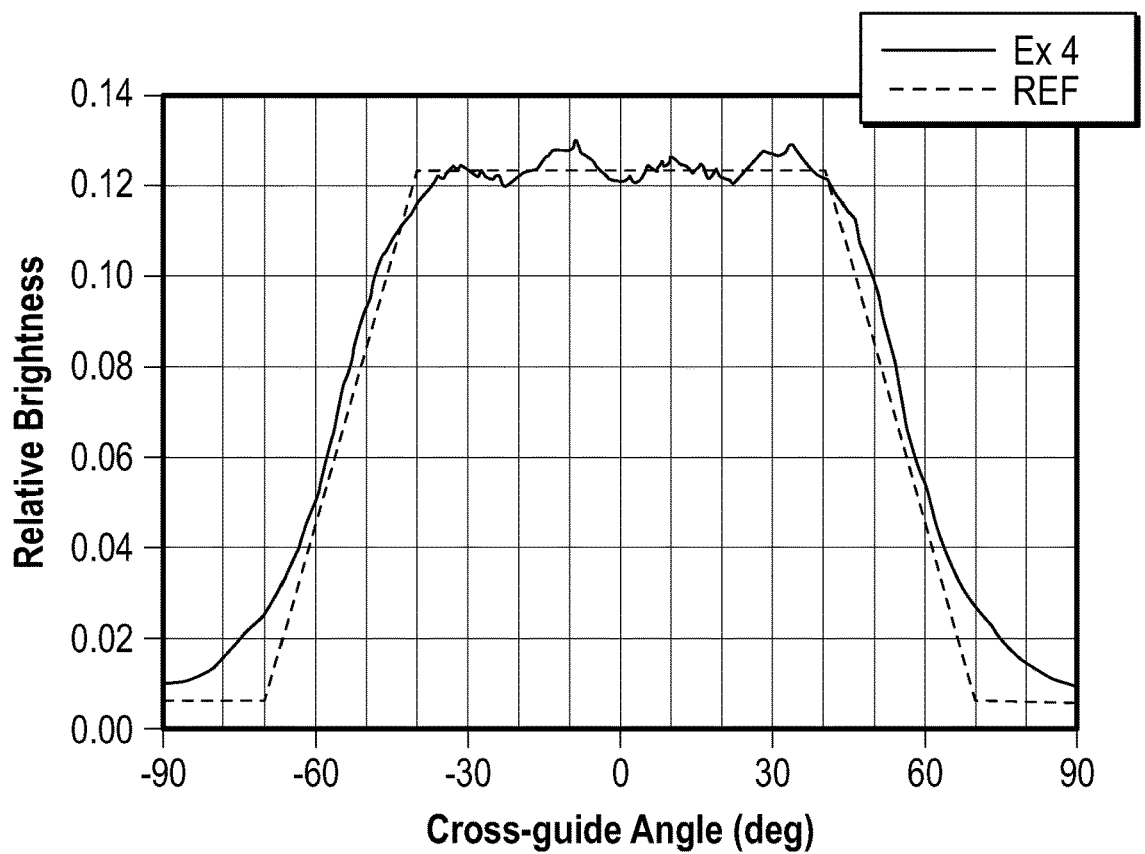
FIG. 13B is a plot of luminance distribution.
Figure 14A:
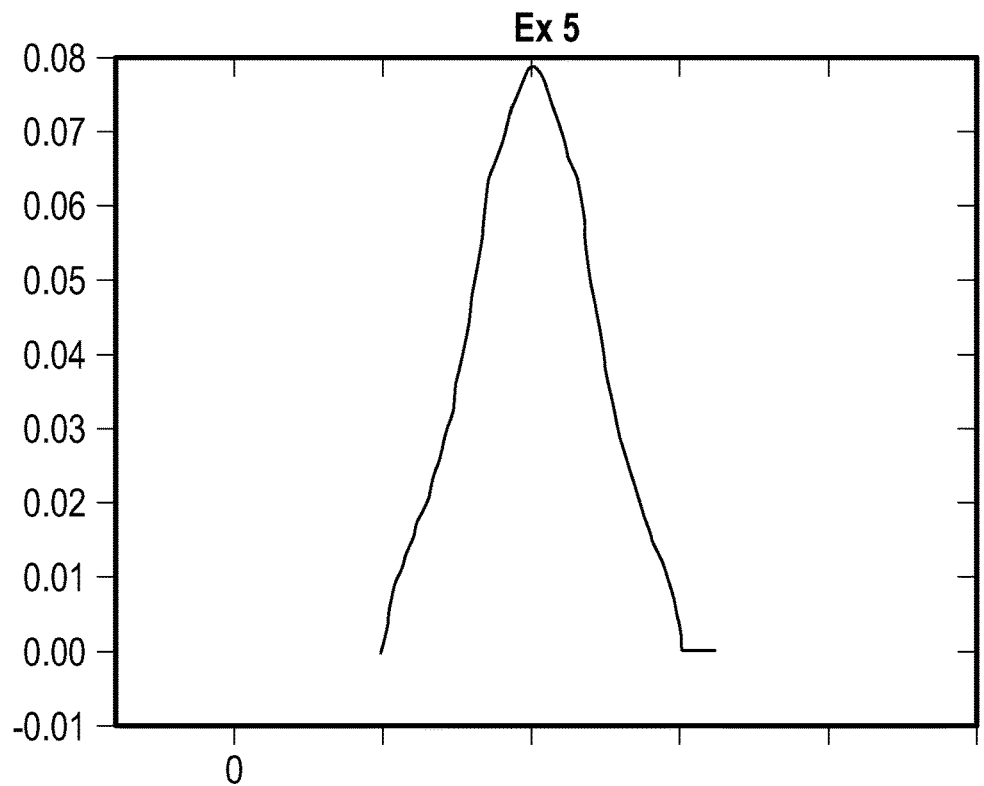
FIG. 14A is a geometric profile of a spreader structure.
Figure 14B:
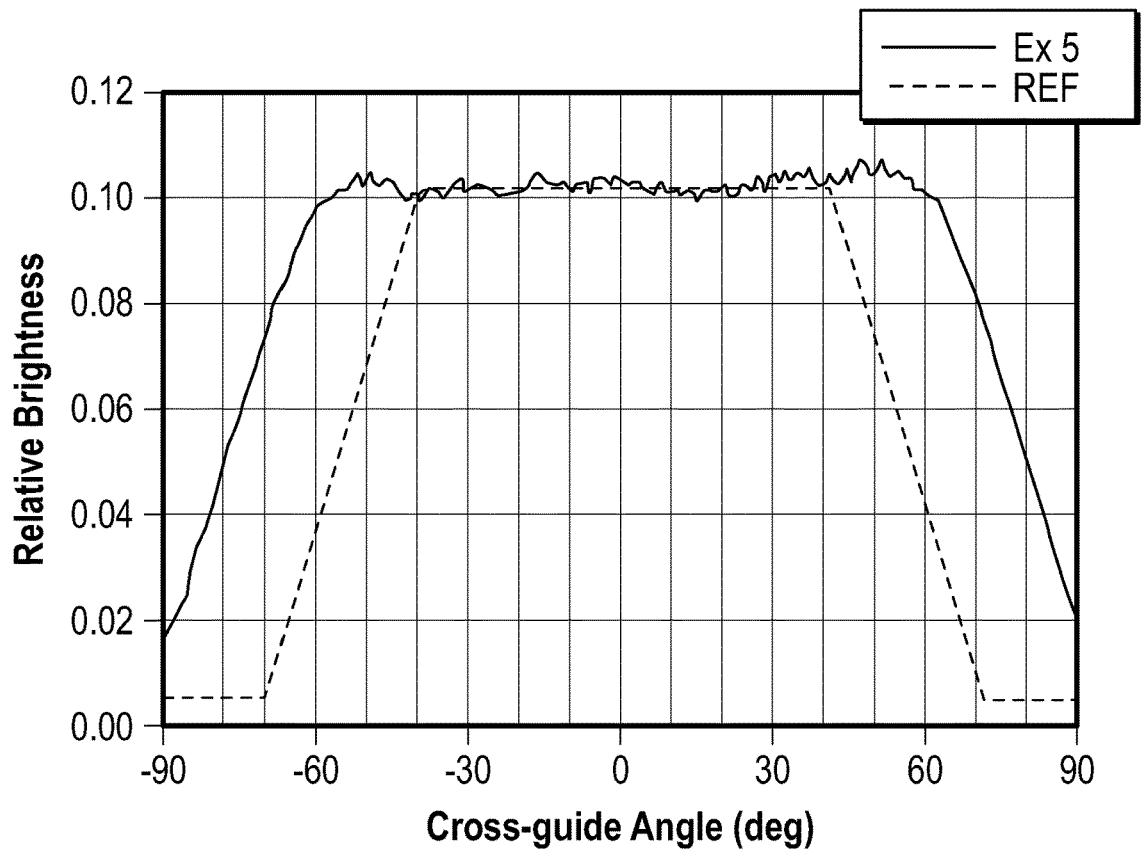
FIG. 14B is a plot of luminance distribution.

This design approach of using a functional form like that illustrated in FIG. 3 and allowing for linear section to blend slope discontinuities is a powerful tool to accommodate for differing desired targets for viewing angular range. FIGS. 12A and B show such a design for a 35 degree flat top where discontinuities are small. FIGS. 13A and B show a design that covers out to 40 degrees where increasing the slope discontinuity appears beneficial. FIGS. 14A and B demonstrate it is possible to extend even to beyond 60 degree width flat tops. There is a continuous design window—using this new functional form for structural shapes—which extends from about 35 degrees flat top to beyond 60 degrees flat top viewing angular range. Designs of this functional form can create patterns with flat tops over a wide range of width targets.

The complete disclosures of the publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. An optical system, comprising:
   (a) a turning film, comprising:
      a first substantially smooth surface, wherein the first substantially smooth surface defines a display axis extending perpendicular to the first substantially smooth surface; and
      a first structured surface comprising a plurality of first microstructures defining a first plurality of substantially parallel grooves,
      wherein the turning film outputs light substantially collimated in a first plane; and
   (b) a lenticular diffuser, comprising:
      a second substantially smooth surface substantially perpendicular to the display axis; and
      a second structured surface comprising a plurality of second microstructures defining a second plurality of substantially parallel grooves extending along a plane substantially perpendicular the display axis,
      wherein the second structured surface comprising a plurality of second microstructures comprises a plurality of lenticular prisms separated by substantially flat land areas, the lenticular prisms having a rounded tip and two sides comprising a linear base section and a linear tip section connected by a polynomial blend section;
      wherein a cross section of each lenticular prism extends along a plane substantially parallel to the display axis in a direction from the second substantially smooth surface to a vertex,
      wherein the lenticular diffuser is optically coupled to the turning film, and wherein the lenticular diffuser reflects and refracts light substantially collimated in the first plane toward a second plane substantially perpendicular to the first plane,
      wherein the first plurality of substantially parallel grooves is substantially perpendicular to the second plurality of substantially parallel grooves, and
      wherein the first substantially smooth surface is adjacent the second structured surface.

2. The optical system of claim 1 wherein the lenticular diffuser comprises a first material having a first refractive index and a second material having a second refractive index, wherein the first material forms the plurality of lenticular prisms and the second material is adjacent the first material and wherein the first refractive index is greater than the second refractive index.

3. The optical system of claim 2 wherein the difference between the first refractive index and the second refractive index is about 0.1 to about 0.3.

4. The optical system of claim 1 wherein the lenticular prisms have a pitch of about 10 micrometers to about 200 micrometers.

5. The optical system of claim 4 wherein the lenticular prisms have a pitch of about 14 micrometers to about 80 micrometers.

6. The optical system of claim 1 wherein the lenticular prisms have base angles of about 75 degrees to about 85 degrees.

7. The optical system of claim 6 wherein the lenticular prisms have base angles of about 77 degrees to about 82 degrees.

8. The optical system of claim 1 wherein the lenticular prisms have a tip radius of about 0.5 micrometers to about 5 micrometers.

9. The optical system of claim 1 wherein the lenticular prisms have a tip angle of about 65 degrees to about 80 degrees.

10. The optical system of claim 9 wherein the lenticular prisms have a tip angle of about 69 degrees to about 77 degrees.

11. The optical system of claim 1 wherein the lenticular prisms have a tip size fraction of about 0.01 to about 0.05.

12. The optical system of claim 1 wherein the lenticular prisms have a tip linear fraction of about 0.03 to about 0.15.

13. The optical system of claim 1 wherein lenticular prisms have a base linear fraction of about 0 to about 0.1.

14. The optical system of claim 1 wherein the second structured surface has a fill fraction of about 0.7 to about 0.95.

15. The optical system of claim 14 wherein the second structured surface has a fill fraction of about 0.75 to about 0.9.

16. The optical system of claim 1 wherein the polynomial blend section is an order 3, 5 or 7 polynomial.

17. The optical system of claim 1 wherein the tip delta angle is about 0 degrees to about 15 degrees.

18. The optical system of claim 1 wherein the base delta angle is about −15 degrees to about 5 degrees.

19. The optical system of claim 1 wherein the plurality of first microstructures comprises a plurality of two-sided, straight-facet prisms.

20. The optical system of claim 1 further comprising a backlight light guide adjacent the turning film, wherein the backlight light guide outputs substantially collimated light.

21. A liquid crystal display system comprising:
(a) a liquid crystal display,
(b) a backlight light guide, and
(c) a light control film disposed between the backlight light guide and the liquid crystal display, the light control film comprising the optical system of claim 1.

22. An optical system mounted in a vehicle comprising:
(a) a vehicle, and
(b) a liquid crystal display system of claim 21 mounted in the vehicle.

\* \* \* \* \*